US012596493B2

(12) United States Patent
Natu et al.

(10) Patent No.: US 12,596,493 B2
(45) Date of Patent: Apr. 7, 2026

(54) TECHNIQUES FOR DETERMINING A MINIMUM HARDWARE CONFIGURATION USING PERFORMANCE HEADROOM METRICS

(71) Applicant: Dell Products L.P., Hopkinton, MA (US)

(72) Inventors: Gajanan S Natu, Cary, NC (US); Vladimir Shveidel, Pardes-Hana (IL); Aleksey Kabishcher, Marlborough, MA (US)

(73) Assignee: Dell Products L.P., Hopkinton, MA (US)

( * ) Notice: Subject to any disclaimer, the term of this patent is extended or adjusted under 35 U.S.C. 154(b) by 629 days.

(21) Appl. No.: 18/078,366

(22) Filed: Dec. 9, 2022

(65) Prior Publication Data

US 2024/0192869 A1    Jun. 13, 2024

(51) Int. Cl.
  *G06F 3/06* (2006.01)
  *G06F 9/50* (2006.01)
(52) U.S. Cl.
  CPC .......... *G06F 3/0635* (2013.01); *G06F 3/0604* (2013.01); *G06F 3/0634* (2013.01); *G06F 3/067* (2013.01); *G06F 9/5016* (2013.01); *G06F 9/505* (2013.01); *G06F 9/5077* (2013.01)
(58) Field of Classification Search
  CPC .... G06F 3/0635; G06F 3/0604; G06F 3/0634; G06F 3/067; G06F 9/5016; G06F 9/505; G06F 9/5077
  See application file for complete search history.

(56) References Cited

U.S. PATENT DOCUMENTS

| | | | | |
|---|---|---|---|---|
| 11,507,327 B1 * | 11/2022 | Shveidel | ............... | G06F 3/0629 |
| 2019/0116237 A1 * | 4/2019 | Gibson | ................... | H04L 67/60 |
| 2020/0206621 A1 * | 7/2020 | Ju | ........................... | G06N 5/04 |
| 2021/0157645 A1 * | 5/2021 | Yanacek | .............. | G06F 9/5077 |

(Continued)

OTHER PUBLICATIONS

U.S. Appl. No. 17/484,576, filed Sep. 24, 2021, entitled System and Method of Estimating Performance Headroom in a Storage System, to Vladimir Shveidel, et al.

(Continued)

*Primary Examiner* — Peng Ke
(74) *Attorney, Agent, or Firm* — BainwoodHuang

(57) ABSTRACT

Processing in an embodiment can include: receiving a request for a new hardware configuration of a data storage system, wherein the data storage system has a current configuration and is running a workload W1 with a workload pattern P1 having an associated workload periodicity interval, wherein the new hardware configuration is modeled as running an associated workload W2 with the workload pattern P1 and the associated workload periodicity interval, wherein the workload W2 is equal to the workload W1 multiplied by a target scale factor (TSF); in response to the request, determining the new hardware configuration in accordance with the TSF and a plurality of hardware utilizations of a plurality of hardware components in the current configuration while running the workload W1 with the workload pattern P1 having the associated workload periodicity interval; and upgrading the current configuration of the data storage system based on the new hardware configuration.

20 Claims, 9 Drawing Sheets

(56)  References Cited

U.S. PATENT DOCUMENTS

| | | | |
|---|---|---|---|
| 2023/0089022 A1* | 3/2023 | Miyamoto | G06F 3/0625 |
| | | | 711/154 |
| 2023/0136226 A1* | 5/2023 | Mo | G06F 9/5022 |
| | | | 718/104 |
| 2023/0217253 A1* | 7/2023 | Palermo | H04W 12/125 |
| | | | 726/23 |
| 2023/0244546 A1* | 8/2023 | Dhoot | H04L 9/50 |
| | | | 718/104 |

OTHER PUBLICATIONS

U.S. Appl. No. 17/198,551, filed Mar. 11, 2021, entitled Adaptive Turbo Toggling, to Vladimir Shveidel, et al.
U.S. Appl. No. 17/967,240, filed Oct. 17, 2022, entitled Data Storage System With Dynamic Workload Adjustment Based on Headroom Estimation, to Aleksey Kabishcer, et al.

\* cited by examiner

100

Host I/O 252

Front end (FE) components 254
(e.g., FE ports and FE software)

Data path (DP) components 260
(e.g., DP software, CPU or processing cores and NVRAM)

Back end (BE) components 262
(e.g., BE controller, BE PIDs
such as SSDs)

250

| A | B | C | D | E | F | G | H | I | J |
|---|---|---|---|---|---|---|---|---|---|
| HW | Load reserve over T (LR) | LR % | Current Utilization/ saturation% =100 - C | Target scale factor for F(t) | %Utilization/ Saturation when target is reached =D*E | Max HW limit | HW scale factor= F/G | Current config | New config= I*H |
| CPU | MIN(LLR, min PLR) | 30 | 70 | 3 | 210 | 75 | 2.8 | 16 | 45 |
| NVRAM | MIN(NVRAM_HLR) | 40 | 60 |  | 180 | 90 | 2 | 2 | 4 |
| SSD | MIN(SSD HLR) | 80 | 20 |  | 60 | 90 | <=1 | 6 | 6 |
| FE | MIN (FE HLR) | 70 | 30 |  | 90 | 90 | <=1 | 4 | 4 |

FIG. 7

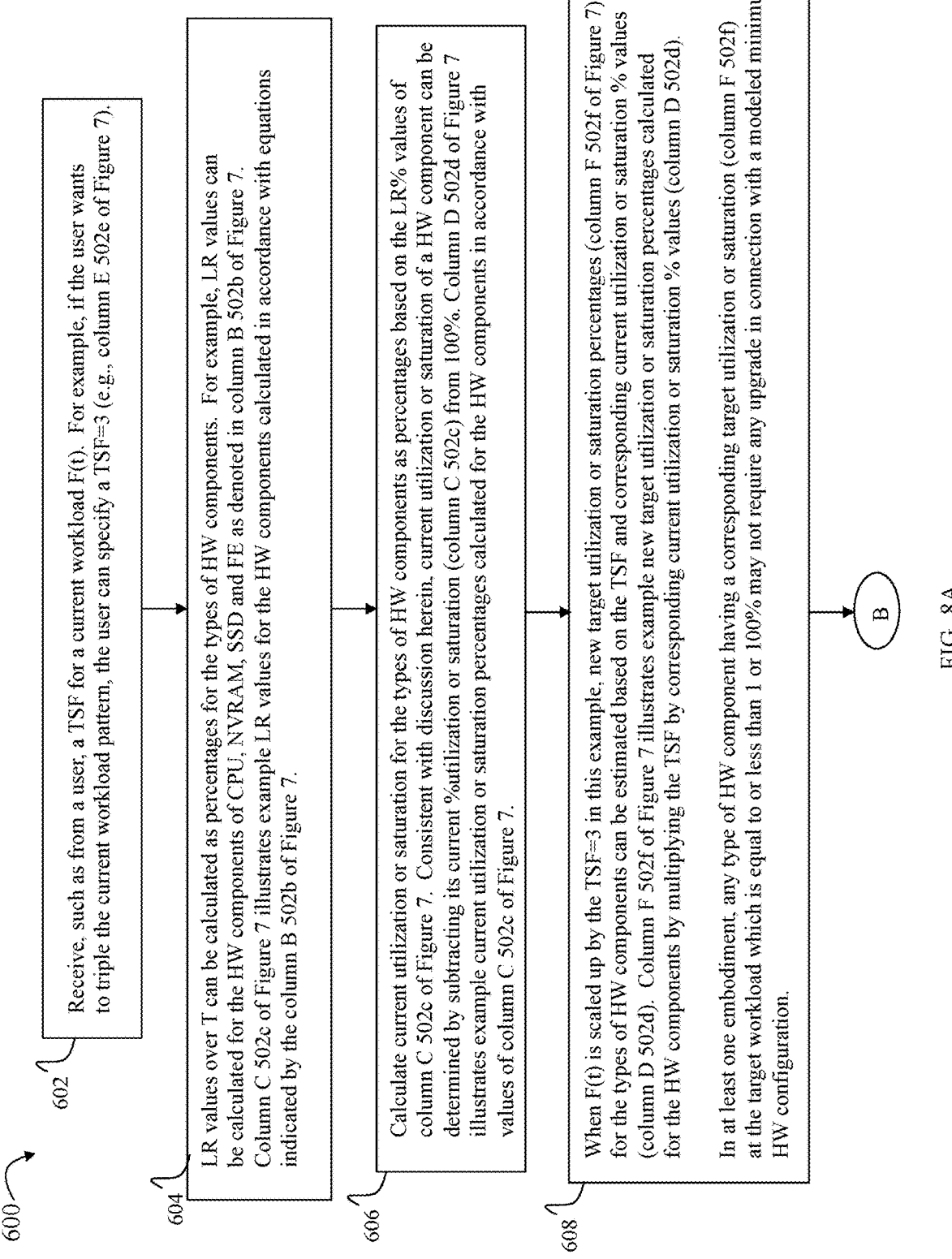

600

602
Receive, such as from a user, a TSF for a current workload F(t). For example, if the user wants to triple the current workload pattern, the user can specify a TSF=3 (e.g., column E 502e of Figure 7).

604
LR values over T can be calculated as percentages for the types of HW components. For example, LR values can be calculated for the HW components of CPU, NVRAM, SSD and FE as denoted in column B 502b of Figure 7. Column C 502c of Figure 7 illustrates example LR values for the HW components calculated in accordance with equations indicated by the column B 502b of Figure 7.

606
Calculate current utilization or saturation for the types of HW components as percentages based on the LR% values of column C 502c of Figure 7. Consistent with discussion herein, current utilization or saturation of a HW component can be determined by subtracting its current %utilization or saturation (column C 502c) from 100%. Column D 502d of Figure 7 illustrates example current utilization or saturation percentages calculated for the HW components in accordance with values of column C 502c of Figure 7.

608
When F(t) is scaled up by the TSF=3 in this example, new target utilization or saturation percentages (column F 502f of Figure 7) for the types of HW components can be estimated based on the TSF and corresponding current utilization or saturation % values (column D 502d). Column F 502f of Figure 7 illustrates example new target utilization or saturation percentages calculated for the HW components by multiplying the TSF by corresponding current utilization or saturation % values (column D 502d).

In at least one embodiment, any type of HW component having a corresponding target utilization or saturation (column F 502f) at the target workload which is equal to or less than 1 or 100% may not require any upgrade in connection with a modeled minimum HW configuration.

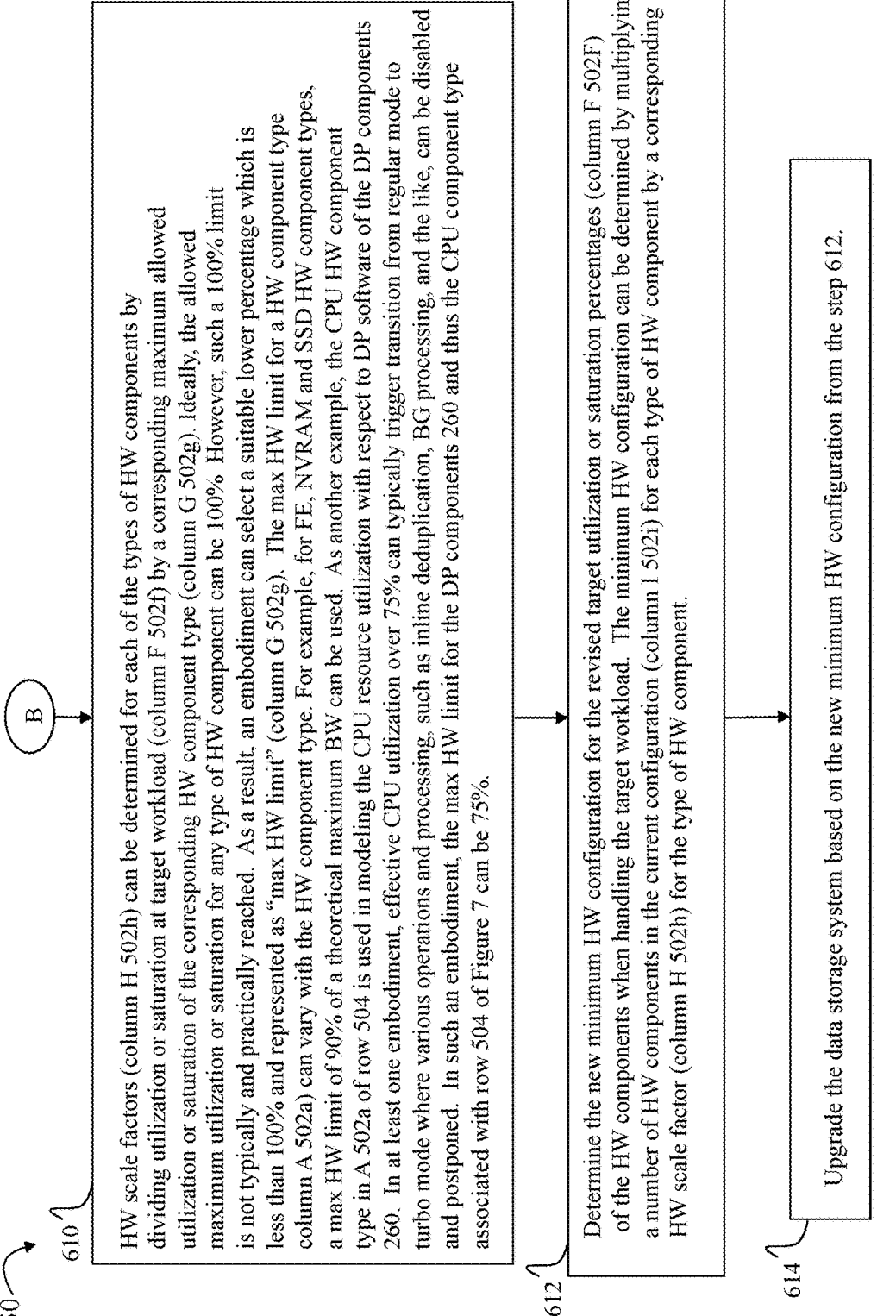

650

B

610

HW scale factors (column H 502h) can be determined for each of the types of HW components by dividing utilization or saturation at target workload (column F 502f) by a corresponding maximum allowed utilization or saturation of the corresponding HW component type (column G 502g). Ideally, the allowed maximum utilization or saturation for any type of HW component can be 100%. However, such a 100% limit is not typically and practically reached. As a result, an embodiment can select a suitable lower percentage which is less than 100% and represented as "max HW limit" (column G 502g). The max HW limit for a HW component type column A 502a) can vary with the HW component type. For example, for FE, NVRAM and SSD HW component types, a max HW limit of 90% of a theoretical maximum BW can be used. As another example, the CPU HW component type in A 502a of row 504 is used in modeling the CPU resource utilization with respect to DP software of the DP components 260. In at least one embodiment, effective CPU utilization over 75% can typically trigger transition from regular mode to turbo mode where various operations and processing, such as inline deduplication, BG processing, and the like, can be disabled and postponed. In such an embodiment, the max HW limit for the DP components 260 and thus the CPU component type associated with row 504 of Figure 7 can be 75%.

612

Determine the new minimum HW configuration for the revised target utilization or saturation percentages (column F 502f) of the HW components when handling the target workload. The minimum HW configuration can be determined by multiplying a number of HW components in the current configuration (column I 502i) for each type of HW component by a corresponding HW scale factor (column H 502h) for the type of HW component.

614

Upgrade the data storage system based on the new minimum HW configuration from the step 612.

FIG. 8B

TECHNIQUES FOR DETERMINING A MINIMUM HARDWARE CONFIGURATION USING PERFORMANCE HEADROOM METRICS

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques of the present disclosure can include a computer-implemented method, a system and a non-transitory computer readable medium. The system can include one or more processors and a memory including code that, when executed performs the method. The non-transitory computer readable medium can include code that, when executed, performs the method. The method can comprise: receiving a request for a new hardware configuration of a data storage system, wherein the data storage system has a current configuration and is currently running a first workload W1 with a workload pattern P1 having an associated workload periodicity interval, wherein the new hardware configuration is modeled as running an associated second workload W2 with the workload pattern P1 and the associated workload periodicity interval, wherein the second workload W2 is equal to the first workload W1 multiplied by a target scale factor (TSF); in response to the request, determining the new hardware configuration in accordance with the TSF and a plurality of hardware utilizations of a plurality of hardware components in the current configuration while running the first workload W1 with the workload pattern P1 having the associated workload periodicity interval; and upgrading the current configuration of the data storage system based on the new hardware configuration.

In at least one embodiment, the plurality of hardware components can include a plurality of hardware component types, and wherein each of the plurality of hardware utilizations can be determined for a corresponding one of the plurality of hardware component types. Processing can include modeling front-end components of an I/O path using at least a first of the plurality of hardware component types, wherein the first hardware component type can have a corresponding hardware utilization of the plurality of hardware utilizations. Determining the new hardware configuration can include: determining a minimum front-end load reserve metric value of a plurality of front-end load reserve metric values for the specified periodicity interval; and calculating said corresponding hardware utilization as a result of subtracting the minimum front-end load reserve metric value from 100%. The first hardware component type can include front-end ports of the data storage system which receive I/O requests from external storage system clients. Determining the new hardware configuration can include: multiplying the corresponding hardware utilization by the TSF to obtain a second hardware utilization modeling utilization of the first hardware component type when running the second workload W2; dividing the second hardware utilization by a maximum utilization to obtain a hardware scale factor; and multiplying the hardware scale factor by a current number of resources of the first hardware component type to obtain a revised number of resources of the first hardware component type, wherein the revised number indicates an amount of resource of the first hardware component type included in the new hardware configuration. If the hardware scale factor is not greater than 1 or 100%, the current number of resources of the first hardware component type can be capable of running the second workload W2 with the workload pattern P1 and the associated workload periodicity interval.

In at least one embodiment, processing can include: modeling back-end components of an I/O path using at least a first of the plurality of hardware component types, wherein the first hardware component type has a corresponding hardware utilization of the plurality of hardware utilizations. Determining the new hardware configuration can include: determining a minimum back-end load reserve metric value of a plurality of back-end load reserve metric values for the specified periodicity interval; and calculating said corresponding hardware utilization as a result of subtracting the minimum back-end load reserve metric value from 100%. Determining the new hardware configuration can include: multiplying the corresponding hardware utilization by the TSF to obtain a second hardware utilization modeling utilization of the first hardware component type when running the second workload W2; dividing the second hardware utilization by a maximum utilization to obtain a hardware scale factor; and multiplying the hardware scale factor by a current number of resources of the first hardware component type to obtain a revised number of resources of the first hardware component type, wherein the revised number indicates an amount of resource of the first hardware component type included in the new hardware configuration. If the hardware scale factor is not greater than 1 or 100%, the current number of resources of the first hardware component type can be capable of running the second workload W2 with the workload pattern P1 and the associated workload periodicity interval. The first hardware component type can include non-volatile storage devices providing back-end storage of storage client data in the data storage system.

In at least one embodiment, processing can include modeling data path components of an I/O path using at least a first of the plurality of hardware component types, wherein the first hardware component type has a first corresponding hardware utilization of the plurality of hardware utilizations, wherein the first hardware component type includes processor resources executing first software included in the data path components. Determining the new hardware configuration can include: determining a long term load reserve (LLR) metric value; determining a minimum peak load reserve (PLR) metric value of a plurality of PLR metric values for the specified periodicity interval; determining a first minimum of the LLR metric value and the minimum PLR; and calculating said corresponding first hardware utilization as a result of subtracting the first minimum from 100%. Determining the new hardware configuration can include: multiplying the corresponding first hardware utilization by the TSF to obtain a second hardware utilization modeling utilization of the first hardware component type when running the second workload W2; dividing the second hardware utilization by a maximum utilization to obtain a hardware scale factor; and multiplying the hardware scale factor by a current number of resources of the first hardware component type to obtain a revised number of resources of the first hardware component type, wherein the revised number indicates an amount of resource of the first hardware component type included in the new hardware configuration. If the hardware scale factor is not greater than 1 or 100%, the current number of resources of the first hardware component type can be capable of running the second workload W2 with the workload pattern P1 and the associated workload periodicity interval. Modeling the data path components of the I/O path can use the first hardware type and additionally use a second of the plurality of hardware types. The second hardware component type can have a second corresponding hardware utilization of the plurality of hardware utilizations, wherein the second hardware component type can include first non-volatile storage used to log or cache write operations and associated write data for the write operations received at the data storage system. The first non-volatile storage can include non-volatile random access memory. The first software can include software that performs I/O processing, flushing of recorded write data and write operations from the first non-volatile storage, and background operations. The background operations can include at least one of: garbage collection, data deduplication, and compression.

BRIEF DESCRIPTION OF THE DRAWINGS

Features and advantages of the present disclosure will become more apparent from the following detailed description of exemplary embodiments thereof taken in conjunction with the accompanying drawings in which:

FIG. 7 is a table of information used in at least one embodiment in accordance with the techniques of the present disclosure.

FIGS. 8A and 8B are flowcharts of processing steps that can be performed in at least one embodiment in accordance with the techniques of the present disclosure.

DETAILED DESCRIPTION OF EMBODIMENT(S)

Figure 1:
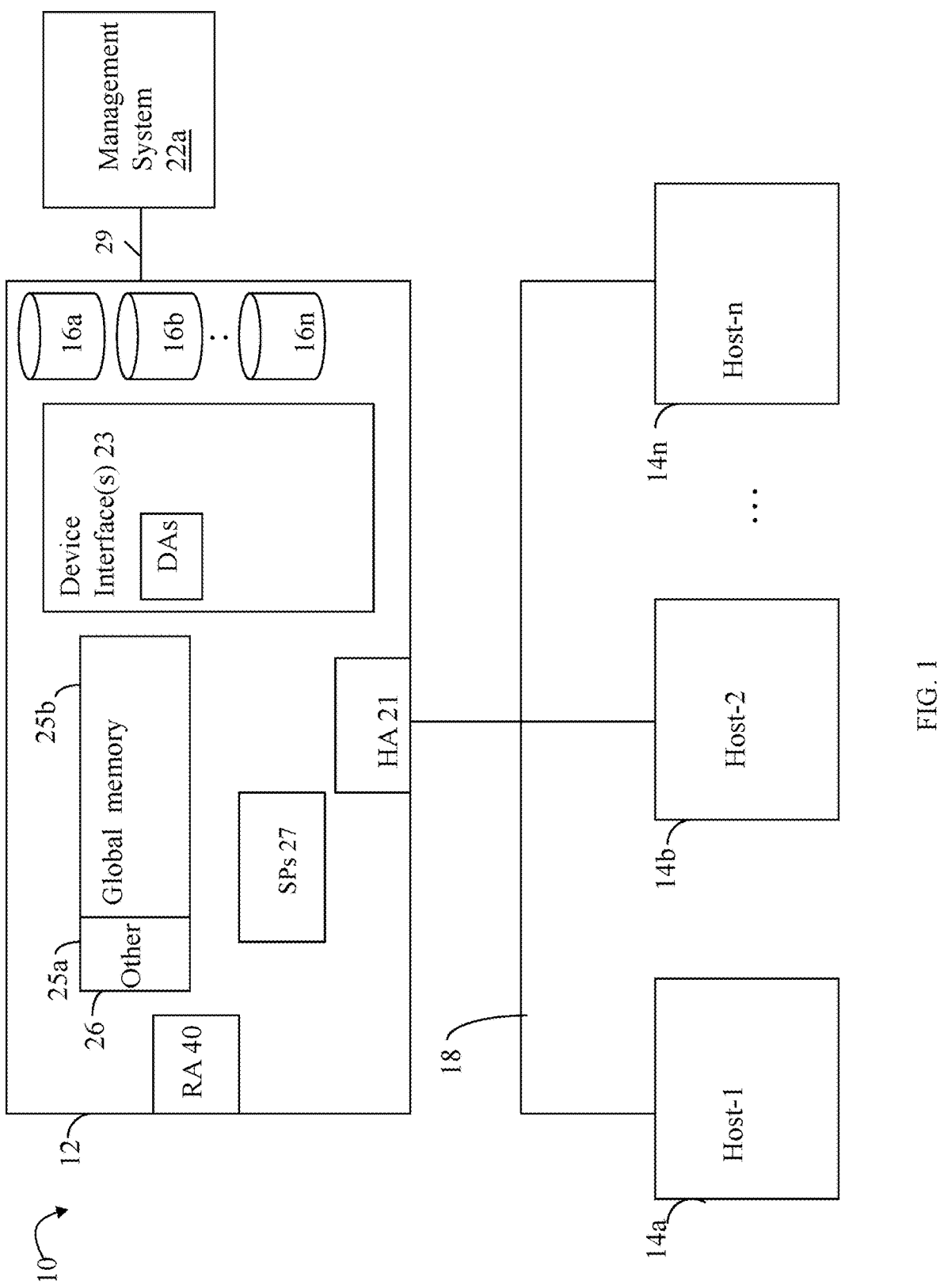
FIG. 1 is an example of components included in a system in accordance with the techniques of the present disclosure.

A system, such as a data storage system, can have a given periodic workload for a corresponding workload pattern. A user, such as a data storage administrator of the data storage system, can be interested in estimating additional hardware required in order to handle an increase in the current workload of the system for the corresponding workload pattern. In particular, the workload increase can be characterized in one aspect as a scaled-up workload relative to the current workload where the current workload and the resulting increased workload generally have the same workload pattern. The workload can be an I/O workload expressed using any one or more suitable workload metrics such as, for example, I/O operation rate such as I/Os per second, average I/O data payload or size, and the like. The workload pattern can be expressed using the one or more workload metrics characterizing the I/O workload over a defined time period T, where the workload can vary throughout the defined time period T. In some cases, the workload increase can be expressed using an increase factor relative to the current workload. For example, a data storage system can be currently servicing a user or client workload W1 of SQL database transactions for 2000 clients. The administrator of the data storage system may want to know what hardware configuration would be required if, in a modeled system, the number of clients issuing similar SQL transactions increases from 2000 to 6000, whereby the modeled system's workload W2 is generally 3 times the current workload W1 (e.g., W2=3*W1), assuming the corresponding workload pattern of the current system configuration is maintained in the modeled system.

Generally, hardware (HW) requirements can be dependent on the workload pattern and its periodicity. As a result, the workload pattern and resulting HW resource utilization or current level of HW saturation can be considered when estimating HW requirements. From a user perspective, such an estimation of the HW requirements can provide a realistic starting point for planning HW upgrades for a data storage system. Estimating HW resources required to service an increased, scaled up current workload activity to reach a target workload can include determining the HW utilization for a current workload pattern, and determining new or additional HW resources needed to service the target workload beyond the current system's saturation point.

In at least one embodiment, the techniques of the present disclosure can include using various HW utilization information to establish a new approach to recommend a minimum HW configuration which supports an expected increment in current workload activity while maintaining a current workload pattern.

In at least one embodiment, the techniques of the present disclosure can include, for a current periodic workload, determining HW utilization or current level of saturation of front-end (FE) data storage system ports, data path component processing cores, non-volatile storage such as NVRAM (non-volatile random access memory) used for persistent log storage, and non-volatile storage such as solid state storage devices (SSDs) used for longer term backend (BE) storage. Processing can use a target workload scale up requirement to linearly scale up current HW utilization or saturation of the different types of HW components and determine corresponding HW scale up factors for the different types of HW components. Processing can also include determining new HW requirements based on the HW scale up factors for the HW components, a current HW configuration and maximum saturation or utilization limits for each type of HW component.

In at least one embodiment, the minimum HW configuration estimated using the techniques of the present disclosure can be used with a scaled up workload having the same workload pattern as the existing current workload. In at least one embodiment, a system with a HW configuration which is less than the estimated minimum HW configuration determined using the techniques described herein can be expected to be insufficient to support the scaled up target workload. In at least one embodiment, the actual HW configuration implemented to support the scaled up target workload can be greater than the estimated minimum configuration provided using the techniques described herein. In at least one embodiment, the software on the data storage system used to service the workload can remain unchanged for both the current configuration and the new revised configuration determined for the scaled up target workload.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14*a-n*. The data storage array can include one or more RAs used, for example, to facilitate communications between data storage arrays. The data storage array can also include one or more device interfaces 23 for facilitating data transfers to/from the data storage devices 16*a*-16*n*. The data storage device interfaces 23 can include device interface modules, for example, one or more disk adapters (DAs) (e.g., disk controllers) for interfacing with the flash drives or other physical storage devices (e.g., PDS 16*a-n*). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25*b* can be used to facilitate data transfers and other communications between the device interfaces, the HAs and/or the RAs in a data storage array. In one embodiment, the device interfaces 23 can perform data operations using a system cache included in the global memory 25*b*, for example, when communicating with other device interfaces and other components of the data storage array. The other portion 25*a* is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14*a*-14*n* provide data and access control information through channels to the storage systems 12, and the storage systems 12 also provide data to the host systems 14*a-n* through the channels. The host systems 14*a-n* do not address the drives or devices 16*a*-16*n* of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22*a* that can be used to manage and monitor the data storage system 12. In one embodiment, the management system 22*a* can be a computer system which includes data storage system management software or application that executes in a web browser. A data storage system manager can, for example, view information about a current data storage configuration such as LUNs, storage pools, and the like, on a user interface (UI) in a display device of the management system 22*a*. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can be expressed in terms of a LUN and logical address or offset location (e.g., LBA or logical block address) on the LUN. Processing can be performed on the data storage system to further map the target location of the received I/O operation, expressed in terms of a LUN and logical address or offset location on the LUN, to its corresponding physical storage device (PD) and location on the PD. The DA which services the particular PD can further perform processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
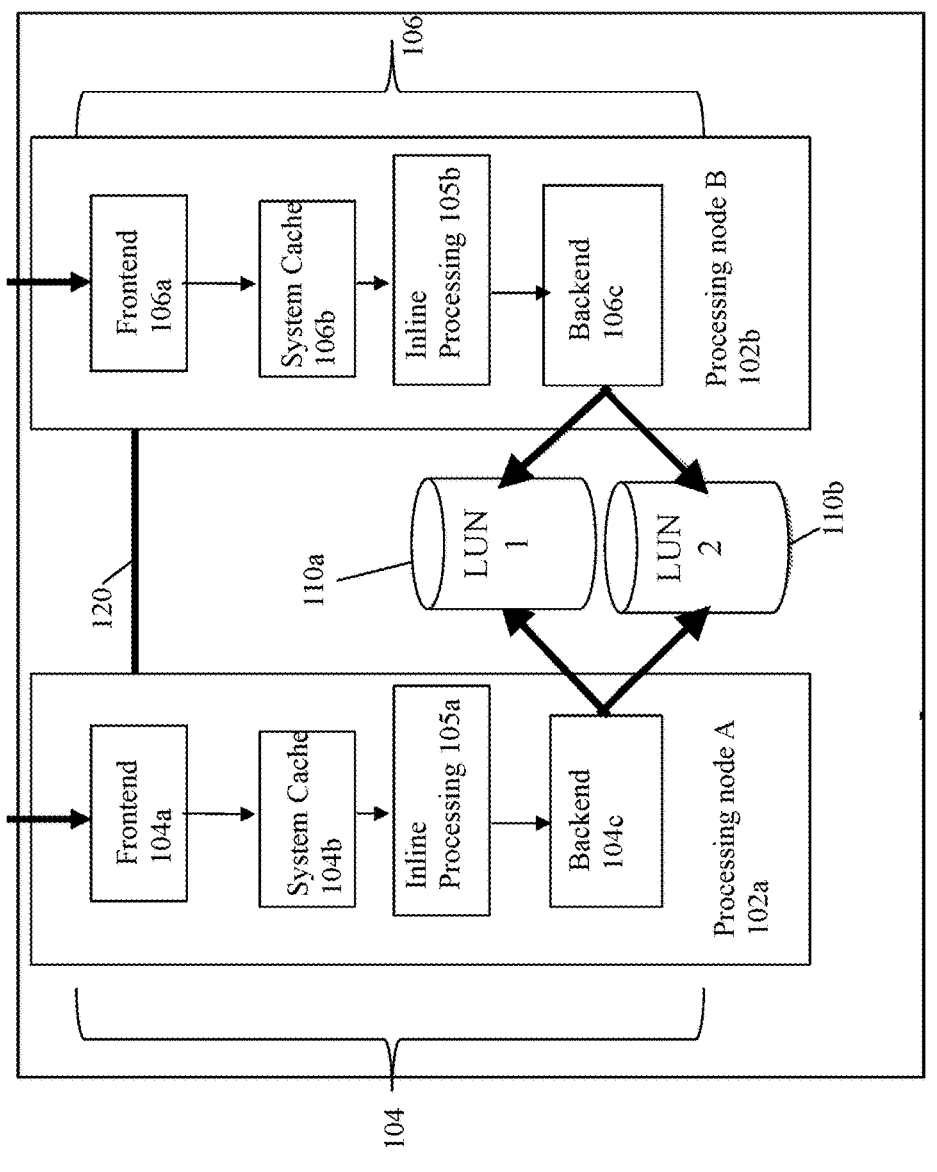
FIG. 2 is an example illustrating the I/O path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication and/or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure (sometimes referred to as a DAE or disk array enclosure) can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a log or journal can be used for recording writes and possibly other information. In one system, the log can be implemented using one or more logging devices that can be shared by both nodes of the dual node architecture. In at least one embodiment, the logging devices can be external with respect to the two nodes and the logging devices can be non-volatile PDs accessible to both nodes. Besides the one or more logging devices, the embodiment can include additional BE PDs that provide the BE non-volatile storage for the nodes where the recorded operations stored in the log (e.g., on the log devices) are eventually flushed to the BE PDs as discussed elsewhere herein.

In at least one embodiment, in addition to such a persistently stored log or journal, one or more of the nodes can also include node-local in-memory copies of information of the log. In at least one embodiment, the node-local in-memory copies of information of the log stored on each node can be stored in volatile memory, such as a RAM, that is local to the node and accessed only within the node. For example, a process or thread of code executing on a core or processor of the node can access for reading and/or writing the RAM or other volatile memory that is local to the node.

In a data storage system, minimizing the latency of I/O requests is a critical performance metric. In at least one data storage system using the dual node architecture such as described in connection with FIG. 2, for write operations, latency is determined by the amount of time taken to store the write data in the log where the write data is visible to both nodes or controllers of the system.

Consistent with other discussion herein, the log or journal can be used to optimize write operation latency. Generally, the write operation writing data is received by the data storage system from a host or other client. The data storage system then performs processing to persistently record the write operation in the log or journal. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques herein is provided below.

Figure 3:
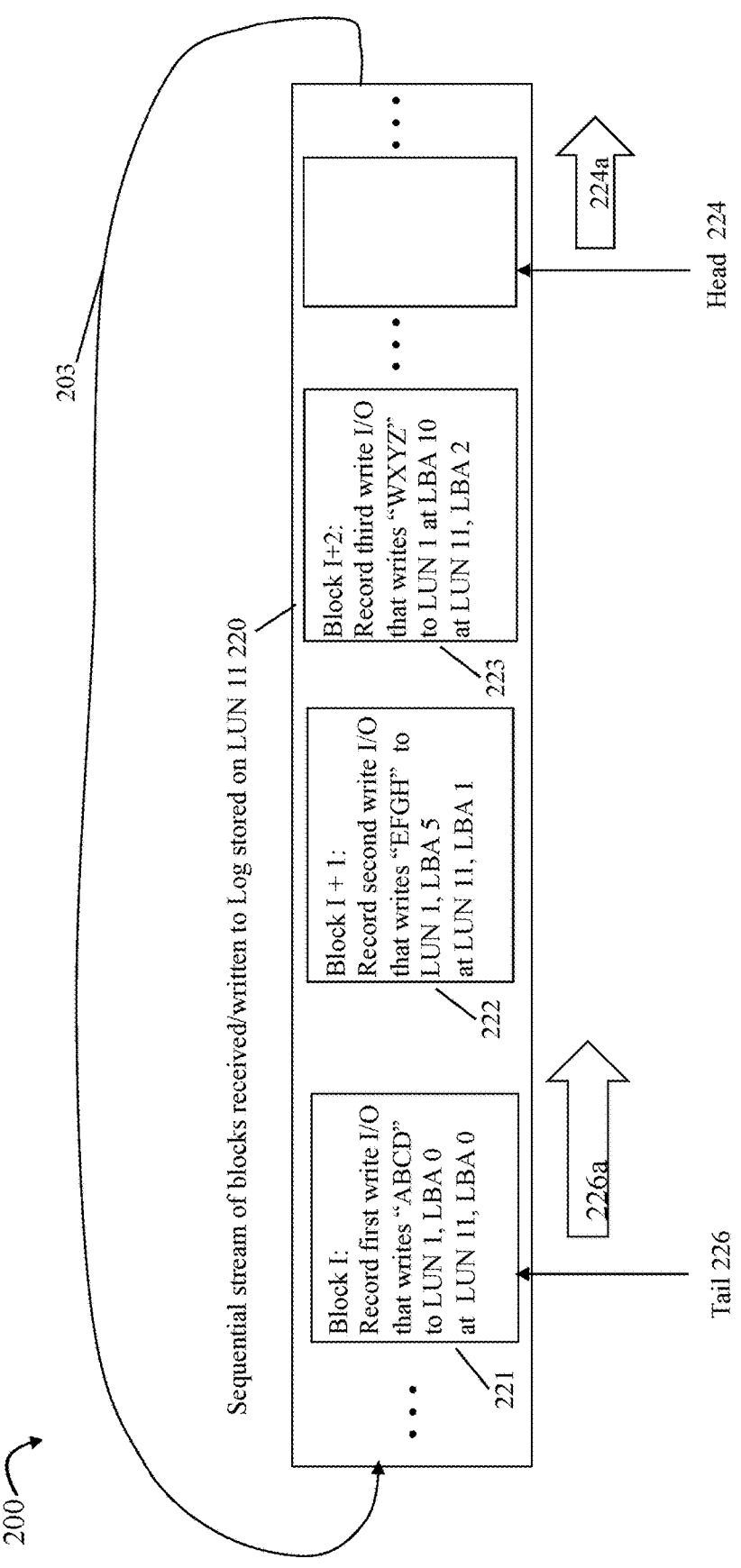
FIG. 3 is an example illustrating use of a log structured system in an embodiment in accordance with the techniques of the present disclosure.

Referring to FIG. 3, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 3, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record or log in the log as each next write I/O operation is recorded. When the head pointer 224 reaches the end of the log by writing to the last sequential block or record of the log, the head pointer can advance 203 to the first sequential block or record of the log in a circular manner and continue processing.

The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer can advance 203 to the first sequential block or record of the log in a circular manner and continue processing. Thus, the circular logical manner in which the records or blocks of the log are processed form a logical ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. Such constraints can consider any possible data dependencies between logged writes (e.g., two logged writes that write to the same logical address) and other logged operations in order to ensure write order consistency.

In one aspect, the data layout (e.g., format or structure) of the log-based data of the log as stored on non-volatile storage can also be physically sequential and contiguous where the non-volatile storage used for the log can be viewed logically as one large log having data that is laid out sequentially in the order it is written to the log.

The data layout of the flushed log data as stored on the BE PDs can also be physically sequential and contiguous. As log records of the log are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage. In at least one embodiment, modifications to metadata including mapping information used by the data storage system can also be similarly recorded in a metadata (MD) log and flushed to the mapped physical storage, and thus the BE PDs, in a manner similar to that as described herein for the written user data which can include data written by host-based writes.

Consistent with other discussion herein, the mapped physical storage (which is mapped to a storage client or user logical address can correspond to the BE PDs providing BE non-volatile storage used for persistently storing user data as well as metadata, such as the mapping information. With a log structured system as discussed herein, as recorded writes in the log are processed, the data written by the writes can be written to new sequential physical storage locations on the BE PDs. Thus, with a log structured system, the data and associated metadata can be written sequentially to the log and also can be written sequentially to the mapped physical storage of the BE PDs. Thus, one characteristic of log structured systems (LSSs) is that updates do not overwrite the existing copy, such as of user data written by a write operation. Rather, the updated or new data written at a target logical address can be stored at a next sequential location in the log and also in a next sequential physical storage location on the BE PDs. In an LSS of the data storage system in at least one embodiment, the physical storage of the BE PDs can also be implemented and managed as a logical circular log in a manner similar to that as described in connection with the log of FIG. 3 containing the data prior to being flushed to the BE PDs.

In data storage systems implementing a LSS such as described above, garbage collection can be performed by the data storage system at various times in an embodiment. Garbage collection processing can be performed by the data storage system on the BE PDs to aggregate allocated stored data blocks with valid data to eliminate free unused physical storage locations (e.g., such as including invalid or stale content) that can be interspersed between the data blocks containing valid data. Such aggregation can include physically copying or moving data blocks of valid user data stored at various physical locations on BE non-volatile storage into a single larger physical storage location. From the perspective of the data storage system, valid data can include the current or most recent copy of client-based write data such as host-based write data (e.g., written by write I/Os received from one or more hosts), as well as the current or most recent copy of flushed metadata, such as the mapping information used by the data storage system to locate a current copy of content associated with a logical address such as, for example, of a read or write I/O operation.

As an example, source blocks can include both used portions (e.g., including valid content) and unused portions (e.g., including invalid content) such that the source blocks include holes of unused storage intermixed with used storage. Garbage collection can include relocating valid content of used storage portions of source blocks to one or more target blocks such that each source block denotes a larger contiguous chunk of storage that is free and available for reuse. Having such a larger contiguous chunk of free storage facilitates efficiently fulfilling subsequent allocation requests for free BE PD capacity from different components for different uses. Such subsequent allocation requests can include, for example, requests for storing data that is flushed from the log as well as other requests for larger amounts of storage.

In a data storage system implementing an LSS, garbage collection can be performed by the data storage system in a continuous manner to manage its BE PDs and reclaim physical storage of holes including unused storage or storage with invalid data. The garbage collection results in performing additional overhead operations such as additional read and write operations in connection with reading valid data from the source blocks and writing the valid data of the source blocks to a target block. The data storage system can perform garbage collection as needed to obtain free contiguous chunks of storage such as non-volatile storage on the BE PDs. The garbage collection performed by the DS can be done as a maintenance or background task as user logical addresses are overwritten or updated with multiple writes to the same logical address. In this case, the data storage system can perform garbage collection to reuse the storage which contains old or invalid content that is replaced or updated with new content in the LSS.

A system, such as a data storage system, can have a given periodic workload for a corresponding workload pattern. A user, such as a data storage administrator of the data storage system can be interested in estimating additional hardware required in order to handle an increase in the current workload of the system for the corresponding workload pattern. In particular, the workload increase can be characterized in one aspect as a scaled-up workload relative to the current workload where the current workload and the resulting increased workload generally have the same workload pattern. The workload can be an I/O workload expressed using any one or more suitable workload metrics such as, for example, I/O operation rate such as I/Os per second, average I/O data payload or size, and the like. The workload pattern can be expressed using the one or more workload metrics characterizing the I/O workload over a defined time period T, where the workload can vary throughout the defined time period T. In some cases, the workload increase can be expressed using an increase factor relative to the current workload. For example, a data storage system can be currently servicing a user or client workload W1 of SQL database transactions for 2000 clients. The administrator of the data storage system may want to know what hardware configuration would be required if, in a modeled system, the number of clients issuing similar SQL transactions increases from 2000 to 6000, whereby the modeled system's workload W2 is generally 3 times the current workload W1 (e.g., W2=3*W1), assuming the corresponding workload pattern of the current system configuration is maintained in the modeled system.

Generally, hardware (HW) requirements can be dependent on the workload pattern and its periodicity. As a result, the workload pattern and resulting HW resource utilization or current level of HW saturation, can be considered when estimating HW requirements. From a user perspective, such an estimation of the HW requirements can provide a realistic starting point for planning HW upgrades for a data storage system. Estimating HW resources required to service an increased, scaled up current workload activity to reach a target workload can include determining the HW utilization for a current workload pattern, and determining new or additional HW resources needed to service the target workload beyond the current system's saturation point.

In at least one embodiment, the techniques of the present disclosure can include using various HW utilization information to establish a new approach to recommend a minimum HW configuration which supports an expected increment in current workload activity while maintaining a current workload pattern.

In at least one embodiment, the techniques of the present disclosure can include, for a current periodic workload, determining HW utilization or current level of saturation of front-end (FE) data storage system ports, data path component processing cores, non-volatile storage such as NVRAM (non-volatile random access memory) used for persistent log storage, and non-volatile storage such as solid state storage devices (SSDs) used for longer term backend (BE) storage. Processing can use a target workload scale up requirement to linearly scale up current HW utilization or saturation of the different types of HW components and determine corresponding HW scale up factors for the different types of HW components. Processing can also include determining new HW requirements based on the HW scale up factors for the HW components, a current HW configuration and maximum saturation or utilization limits for each type of HW component.

In at least one embodiment, the minimum HW configuration estimated using the techniques of the present disclosure can be used with a scaled up workload having the same workload pattern as the existing current workload. In at least one embodiment, a system with a HW configuration which is less than the estimated minimum HW configuration determined using the techniques described herein can be expected to be insufficient to support the scaled up target workload. In at least one embodiment, the actual HW configuration implemented to support the scaled up target workload can be greater than the estimated minimum configuration provided using the techniques described herein. In at least one embodiment, the software on the data storage system used to service the workload can remain unchanged for both the current configuration and the new revised configuration determined for the scaled up target workload.

The foregoing and other aspects of the techniques of the present disclosure are described in more detail in the following paragraphs.

Figure 4:
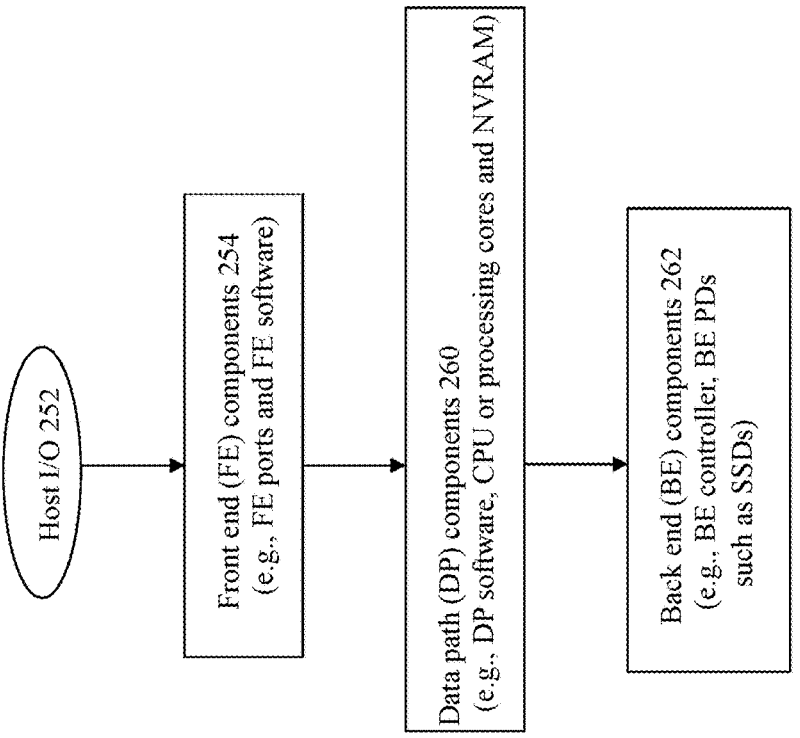
FIG. 4 is an example illustrating components of the I/O path in at least one embodiment in accordance with the techniques of the present disclosure.

In at least one embodiment consistent with other discussion herein and with reference to FIG. 4, the I/O path 250 for an external I/O 252 received at the data storage system from an external client such as a host can include FE components 254, BE components 262, and data path components 260. The FE components 254 can include, for example, FE ports of the data storage system which receive the I/Os where such FE ports can include processors that execute FE-component software. The BE components 262 can include, for example, BE PDs such as non-volatile SSDs and/or HDDs (hard disk or rotating disk drives) used for BE data storage, one or more BE controllers which communicate with the BE PDs, and possibly other components such as one or more switches, and the like, which can vary with the complexity of the BE components of the system. The data path components 260 can include, for example, data path software, processors or processing cores upon which such data path software executes, and NVRAM or other non-volatile storage used for the log or write cache of recorded client write I/Os and possibly other recorded information. The data path software of 260 can include, for example, software which services the received I/Os, records write I/Os in the log or write cache, flushes the recorded operations of the log or write cache to BE storage, performs other various background (BG) operations which can be ancillary to I/O processing, and the like. The BG processing of 260 can include, for example garbage collection processing, performing offline services of stored data such as compression and/or deduplication, and the like.

In connection with the I/O path 250, the FE and BE performance can be primarily determined by the HW capabilities of the corresponding FE and BE HW components, respectively, of 254 and 262. The performance of the data path components 260 can be determined by characteristics of the HW (e.g., such as the number of processors and/or processing cores utilized by 260, characteristics of the NVRAM used as persistent log storage) as well as the efficiency of the data path software to utilize its allocated processor cores and other resources. Current levels of saturation or utilization of HW components, such as of the FE 254 and BE 262, can be determined based on various capability characteristics, respectively, of the FE ports and BE HW components such as the BE PDs such as SSDs, where such capability characteristics can include for example, port or device bandwidth and consumption thereof, and maximum storage capacity. In at least one embodiment, determining the utilization or current level of saturation of the data path components 260 can be more complex due to the dynamic allocation and variation regarding a number of processors and/or processing cores assigned for servicing I/Os, BG processing and flushing the log. In connection with the data path components 260, saturation can depend on both aspects of the HW resources, such as allocated processor resources, as well as the ability of software of the data path components 260 to utilize HW resources efficiently.

Described below are various metrics which can be used to estimate performance headroom in a system, such as a data storage system. Performance headroom as well as the various metrics are described in more detail below. In at least one embodiment, the techniques of the present disclosure utilize such metrics in connection with estimating a new minimum HW configuration for a target workload which can be expected or predicted using a scaling factor with respect to the current workload and current workload pattern of an existing system.

In the following paragraphs, what will first be described are the various metrics which can be utilized in at least one embodiment in accordance with the techniques of the present disclosure. Subsequently, there is a following discussion with respect to use of the various metrics in determining the minimum HW configuration in at least one embodiment in accordance with the techniques of the present disclosure.

A headroom performance metric (also referred to herein as the "headroom metric") can provide a storage system customer with an estimated upper bound on the capacity or capability (e.g., saturation point) of a storage system to sustain an increased workload in its current configuration. If the storage system customer predicts or determines, based on the headroom metric, that the current configuration of the storage system will be insufficient to satisfy expected storage requirement needs, then proactive steps can be taken to upgrade, scale-up, and/or scale-out the storage system. In at least one embodiment, HW and software performance capabilities can be combined to define the system saturation or current utilization, and thus headroom metric. Headroom metric as used herein in at least one embodiment can generally refer to a measure of the load reserve of a storage system for handling a specified workload pattern within a specified periodicity interval. Put another way, headroom with respect to a system can generally characterize how much additional workload the system can handle based on its unused resources.

A headroom metric can denote the reserved load, or remaining capability or capacity of a system to handle additional workload. In FIG. 4, a headroom metric can, for example, characterize the remaining unused resources of the FE components 254, the DP components 260 and the BE components 262. For example, the FE components 254 can be 40% utilized or saturated thereby having 60% of its resources remaining unused; the DP components 260 can be 80% utilized or saturated thereby having 20% of its resources remaining unused; and the BE components 262 can be 40% utilized or saturated thereby having 60% of its resources remaining unused. In this case, the headroom metric can be based on the remaining unused resource percentages of 254, 260 and 262, and in particular, based on the minimum of all such values. In this example, the headroom can be 20%. The foregoing is a general example of headroom. Different metrics described in more detail below can be used to characterize the percentage of unused or remaining resources of the different components 254, 260 and 262.

Figure 5:
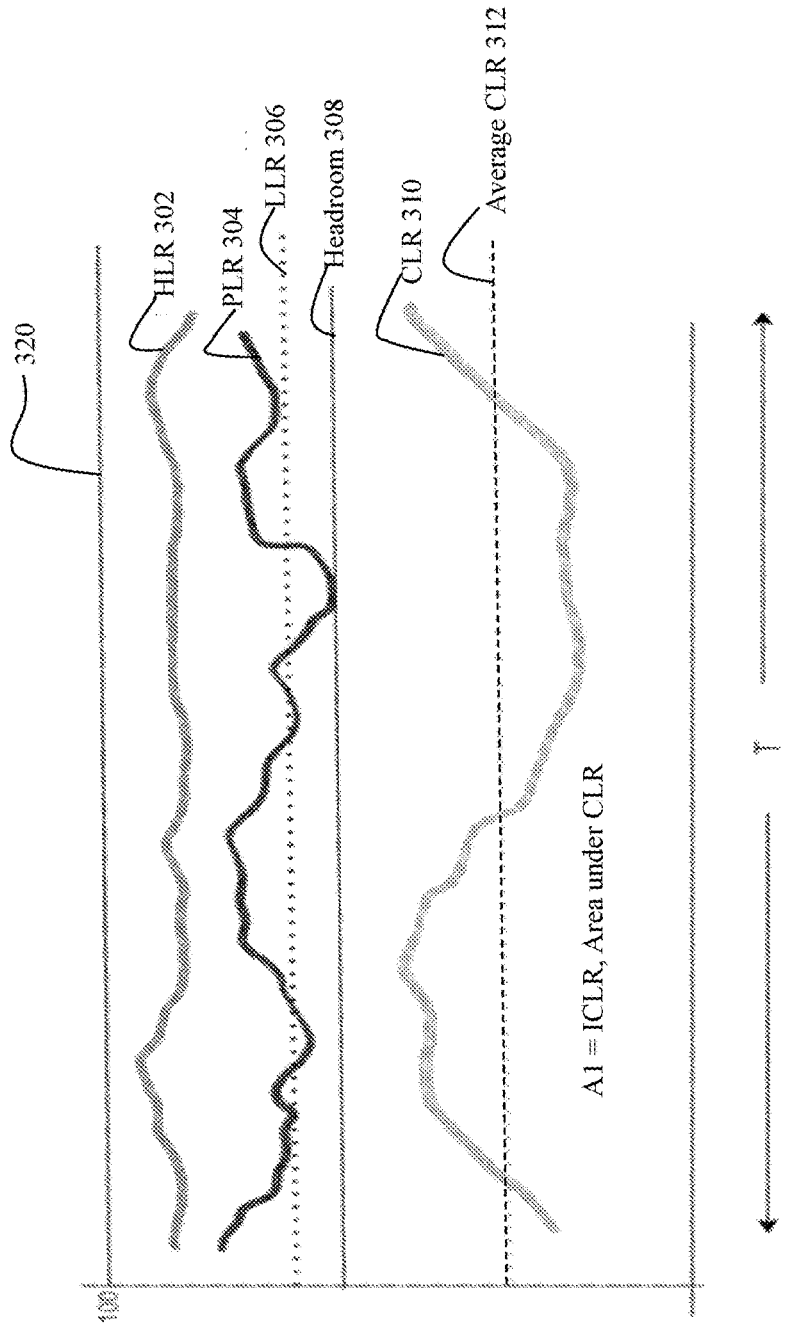
FIG. 5 illustrates various curves of metric for a workload pattern F(t) with periodicity T in at least one embodiment in accordance with the techniques of the present disclosure.

Referring to FIG. 5, shown is an example 300 illustrating various curves for a workload pattern F(t) with periodicity T. F(t) can be a function representing the workload variation over T. The workload can be an I/O workload expressed as an I/O rate or throughput such as I/Os per second (IOPS).

In the example 300, the X axis denotes various points in time during the time period T, and the Y axis denotes the I/O workload as a percentage, where the line 320 denotes 100% or a maximum workload. In this manner, the workloads represented in the example 300 can be characterized as scaled or normalized to denote such a percentage of the maximum workload represented by the line 320.

The curve CLR or current load reserve 310 indicates CLR metric values throughout T denoting how far away the cores, or more generally processor resources used in connection with the data path components 260, are from saturation. In at least one embodiment, the cores or processor resources considered in connection with the CLR can be processor cores allocated to and utilized by the data path software of 260 (e.g., as described in connection with FIG. 4). The curve average CLR 312 denotes the average CLR value during the time period T.

The curve PLR or peak load reserve 304 indicates PLR metric values throughout T denoting how far away the system is from a saturation point, up to which the system can sustain I/O bursts but without performing BG processing. In connection with PLR in a system where the data path software of the data path components 260 include BG processing, I/O processing and flushing the log, no cores are allocated for BG processing and rather all cores are allocated for I/O processing and/or flushing the log.

In at least one embodiment, the PLR metric value is a percentage corresponding to a proportional increase in burst workload that is not to be exceeded during peak periods to avoid a reduction in storage system performance. During such peak periods in connection with the PLR metric, the system does not perform any postponed and/or BG operations. In at least one embodiment, such a proportional increase in burst or sustained workload can refer to a proportional increase in all activities related to the burst or sustained workload including, for example, the number of read and/or write I/Os, the number of snapshot operations performed, and other suitable burst or sustained workload activities.

The curve HLR or hardware load reserve 302 indicates HLR metric values throughout T denoting how far away the system is from a HW saturation point where a maximum bandwidth of HW is reached. In at least one embodiment, the HW can include FE ports, SSDs used as the BE PDs, and NVRAM used for storing the log of recorded writes and possibly other operations. HLR denotes the maximum HW utilization along the periodicity interval or period T with respect to all HW components/component types considered. A first HLR metric, FE HLR, can be determined for the FE HW such as FE ports denoting the maximum HW utilization with respect to FE component HW along the periodicity interval or period T. A second HLR metric, SSD HLR, can be determined for the BE HW such as SSDs of the BE components 262 denoting the maximum HW utilization with respect to BE component HW along the periodicity interval or period T. A third HLR metric, NVRAM HLR, can be determined for the NVRAM HW of the data path components 260 denoting the maximum HW utilization with respect to NVRAM along the periodicity interval or period T. Thus in at least one embodiment, three HLR curves 302 can be determined over T corresponding to the 3 HLR metrics: FE HLR, SSD HLR, and NVRAM HLR. Another HLR curve instance 302 can denote the minimum HLR metric value at each point in time t in the period T, where the minimum HLR metric value at time t is the minimum of the following 3 HLR metric values at time t: FE HLR, SSD HLR and NVRAM HLR.

In at least one embodiment, an HLR metric value with respect to a HW resource (e.g., each of FE HLR, SSD HLR, and NVRAM HLR) can be defined as a percentage denoting the maximum HW resource utilization over the specified periodicity interval.

The curve LLR or long term load reserve 306 denotes LLR metric values throughout T indicating how far away the system is from a saturation point, up to which the system can sustain a long term load over T and also complete any postponed processing during T. In at least one embodiment, the LLR metric value is a percentage corresponding to a proportional increase in sustained workload that is not to be exceeded during a specified periodicity interval to assure that any postponed operations, such as postponed BG operations, can be processed or completed within the same specified periodicity interval. Put another way, during a time period T there can be peaks, bursts or increases of I/O workload where the system can postpone BG operations during such peaks within T. Such deferred or postponed BG operations occurring during T can be characterized as a debt accumulated during T, where the system can operate based on a policy that any such workload debt accumulated during peak periods within T should also be completed during the same T, such as during periods of low I/O workload. To this end, the LLR metric value indicates the maximum workload that can be allowed during a time period T in order to also guarantee that any BG operations postponed during T can also be completed during T.

In further detail in at least one embodiment, the performance of a system can also be affected by executing certain operations (e.g., deduplication, compression, flush, garbage collection) in the background (BG) and/or postponing execution of certain operations, such as certain BG operations, to later periods when at least some system resources are free (or idle). While IOPS can be increased in this way during peak periods, such postponement of BG operations can result in significant backlogs that must be processed within specified time intervals. Further, some postponed operations and/or background flows may be interdependent. In at least one embodiment, a system can employ different logic and/or limits for certain postponed and/or background operations such as in connection with the LLR metric. Thus the LLR metric indicates a sustained workload level which should not be exceeded during T in order to guarantee that the system is able to complete during T any BG operations which have been postponed during T.

In at least one embodiment, workload as used herein can refer to processes that work to accomplish tasks related to client applications such as read/write IO tasks, snapshot tasks, and so on. Workload pattern as used herein can refer to the repeated or regular way such a workload is performed or executed. Periodicity as use herein can refer to a periodicity interval which is a regular interval T at which such a workload pattern tends to recur such as every one or more days, weeks, months, and so on. The current utilization or current level of saturation of the storage system can be determined with reference to the headroom metric, which is a measure of the load reserve of the storage system for handling the specified workload pattern (e.g., read/write IO tasks, snapshot tasks) within the specified periodicity interval T (e.g., day(s), week(s), month(s)). In at least one embodiment, the headroom metric as discussed elsewhere herein such as in connection with EQUATION 3 below can be determined as the minimum of: the LLR metric over T, the minimum PLR metric over T, and the minimum HLR metric over T.

As indicated in FIG. 5, A1 can denote ICLR which is the area under the CLR curve 312, where A1 or ICLR represents unutilized performance capabilities or raw performance headroom. A1 or ICLR which is the area under the CLR curve 312 can be determined in any suitable manner such as, for example, by taking the mathematical integral of the CLR metric values of the CLR curve 312 over T. The raw performance headroom represented by ICLR can't be fully utilized because scheduling of BG processing is generally not optimal. To account for this inefficiency, ICLR denoting the raw performance headroom can be reduced by a factor or coefficient, k. In at least one embodiment, k can be a decimal value which is generally greater than 0.0 and less than 1.0. In at least one embodiment, k can be 0.75. In at least one embodiment, the coefficient k can be a function of workload pattern and system. In at least one embodiment, LLR can be calculated as in EQUATION 1 below:

$$LLR = k * ICLR \qquad \text{EQUATION 1}$$

where
  k is the factor or coefficient described above; and
  ICLR is A1, the area under the CLR curve for the time
    period T.

LLR can denote a saturation point or level of utilization beyond which sustained load can be expected to result in unacceptable I/O latency.

Based on FIG. 5, the performance headroom 308 over period T can calculated as follows:

In a first step S1, determine ICLR or the Area A1 denoting the area under the CLR curve 310 for the time period T. Following the step S1, a step S2 can be performed.

In the step S2, determine LLR=k*ICLR, as in EQUATION 1. Following the step S2, a step S3 can be performed.

In the step S3, determine the min (minimum) value of the PLR metric from the PLR curve 304 over T. Following the step S3, a step S4 can be performed.

In the step S4, determine the hardware load reserves or multiple HLR metric values or curves—SSD HLR, NVRAM HLR, and FE HLR—based on current bandwidth and maximum capability of these components over T. For example for simplicity, assume that the FE components include only the FE ports where, for a single FE port of a data storage system, the single FE port can have a maximum capability such as a maximum bandwidth of X=10 Gbps. For 10 FE ports collectively the total collective or maximum capability can be 10× or 100 Gbps. At a point in time t during the period T, the current FE port bandwidth consumed can be, for example, 50 Gbps so that the current utilization or saturation is 50%. In this case the current load reserve or HLR for the FE ports, and thus the HLR metric value, for t can be 50% (e.g., 100%—current utilization of 50%, where 100% can denote the maximum capability). In a similar manner, metric values for SSD HLR and NVRAM HLR can be determined based on the utilization or saturation and maximum capabilities of such HW components. Following the step S4, a step S5 can be performed.

In the step S5, determine the minimum HLR metric value over T as in EQUATION 2:

$$\min \text{ HLR over } T = \text{MIN}(\text{SSD HLR},\text{NVRAM HLR},\text{FE HLR}) \text{ over } T \qquad \text{EQUATION 2.}$$

where the "MIN(SSD HLR, NVRAM HLR, FE HLR) over T" calculates the single minimum HLR metric value of all HLR metric values of all the HLR curves, including SSD HLR, NVRAM HLR, and FE HLR, for the time period T. In at least one embodiment, the HLR curve 302 can denote, for each point in time t within T, the minimum HLR metric value of all HLR curves for different hardware resources.

Following the step S5, a step S6 can be performed to calculate the single headroom metric value denoted by the line 308 for the period T as follows in EQUATION 3:

$$\text{headroom} = \text{MIN}(\text{LLR},\text{min\_PLR},\text{min\_HLR}) \qquad \text{EQUATION 3}$$

where

LLR can be calculated as in EQUATION 1;

min_PLR denotes the single minimum PLR metric value of the PLR curve 304 during T;

min_HLR denotes the single minimum HLR metric value over T, or single minimum HLR value from the min HLR curve as described in connection with EQUATION 2; and MIN determines the minimum of LLR, min_PLR, and min_HLR.

Thus, headroom of EQUATION 3 is a single value where the headroom can be represented by a minimum of the remaining capabilities of the I/O path including the processing cores of the data path components 260 (as represented by LLR and PLR) and related system HW (e.g., FE ports of FE components 254), SSDs of BE components 262, and NVRAM of data path components 260). The remaining processing core capabilities (or load reserve), denoted as MIN (LLR, min PLR), can be used to estimate effective CPU utilization since it takes into account both CPU resource utilization and the coefficient "k" described above, where "k" characterizes the ability of the data path software to utilize CPU resources, such as CPU cores, efficiently.

In at least one embodiment, the metric values as used in connection with determining the headroom in the step S6 can be a percentage X % between 0 and 100%, where 0%≤X%≤100%, or can otherwise denote a decimal value V1 between 0 and 1, such as where 0.0≤V1≤1.0.

In at least one embodiment, an I/O core saturation metric, sometimes in certain contexts can be referred to as saturation or saturation metric, is discussed below and can be used to calculate CLR metric values (e.g., CLR metric value(t) =100%−I/O core saturation(t), where "t" denotes a point in time in a period T). As also discussed herein such as in connection with EQUATION 2, an LLR metric value can be determined used CLR metric values. As discussed below, in at least one embodiment, PLR metric values can be determined using a special case or instance of the I/O core saturation metric where no CPU resources or cores are allocated to BG processing.

Generally, I/O core saturation in at least one embodiment can consider the dynamic allocation of CPU cores for processing I/Os, flushing write I/Os to BE PDs, and performing various BG processing operations.

Figure 6:
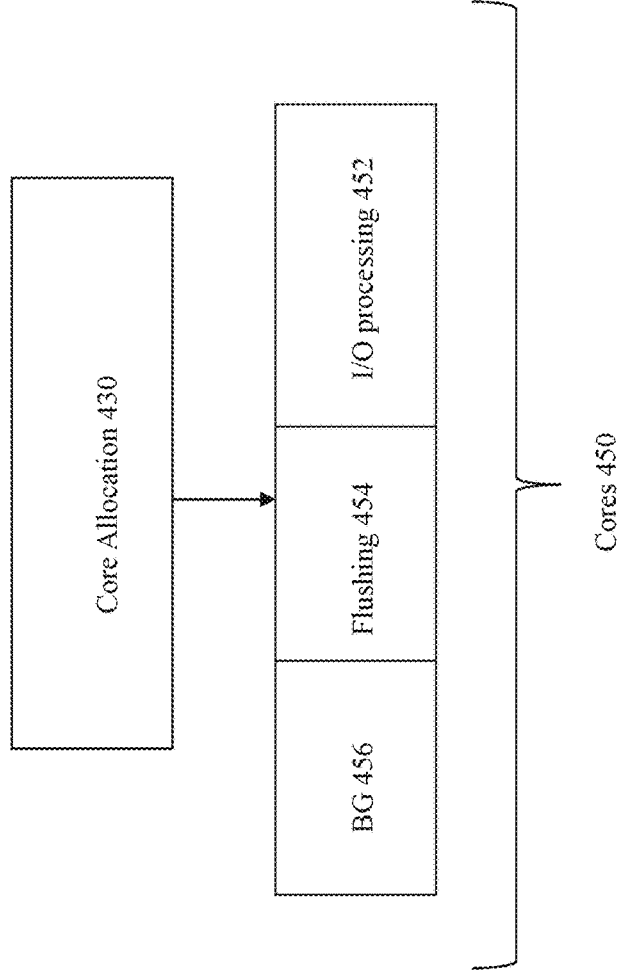
FIG. 6 illustrates dynamic allocation of CPU or processor resources, such as processor cores, in at least one embodiment in accordance with the techniques of the present disclosure.

Referring to FIG. 6, shown is an example 400 illustrating operation of a core allocation component in at least one embodiment in accordance with the techniques of the present disclosure.

The core allocation component 430 can typically run as a background process that responds to operating conditions to vary the allocation of CPU or processor cores among 3 classes of operations: I/O processing 452, flushing 454 and BG processing 456. Consistent with other discussion herein such as in connection with FIG. 4, I/O processing 452 can generally be characterized as foreground processing of read and/or write I/O requests such as from data storage clients including external hosts. Such foregoing write I/O processing can include, for example, recording the write I/O in a log or write cache such as in the NVRAM storage of the log or write cache. Flushing 454 can generally be characterized as flushing recorded, logged, or cached writes and write data, for example, from the NVRAM to the BE PDs. In at least one embodiment, the writes and write data can be recorded in a persistent log on NVRAM which is flushed in connection with flushing 454. BG processing 456 can include various background operations or tasks. BG tasks can include mandatory and/or optional operations such as file system maintenance operations, garbage collection, snapshot related processing, and the like. In at least one embodiment, each node in a system can include a node local instance of the core allocation components 430.

In at least one embodiment, the data storage system can use the core allocation component 430 to dynamically allocate cores 50 for the foregoing 3 uses 452, 454 and 456 depending on operating conditions such as the number of IOPS, I/O size, I/O type (e.g., read or write), accumulated debt of deferred BG operations and other postponed processing, and the like. It can be generally desirable to allocate as many cores 450 as possible to I/O processing 452 for the best foreground I/O processing performance. However, this can be balanced against the needs to perform flushing 454 and other BG operations 456. As the needs of flushing 454 and/or BG processing 456 increase, more cores can be allocated to those operations, and then subsequently reallocated as cores for I/O processing 452.

A model for determining I/O core saturation in at least one embodiment can be based on the following assumptions:

1. Under steady state, flushing cores bandwidth (BW) 454 is equal to I/O processing BW 452.

2. Flush core scaling is linear with write I/O. (This assumption can be valid at low load levels. Although flush cores can scan non-linearly at high workloads, this assumption provides a reasonable modeling approximation).

3. The number of BG cores allocated for BG 456 at a maximum workload can be estimated.

4. The sum or aggregate of cores allocated to BG processing 456, flushing 454 and I/O processing 452 is always equal to the fixed total number of cores 450.

Based on the above assumptions, the current level of I/O core saturation or utilization at a point in time "t" can be calculated as in EQUATION 4 below:

$$\text{saturation} = \frac{((N - F - BG1)^*M) + F}{N - BG1} \qquad \text{EQUATION 4}$$

where:

saturation denotes the current level of I/O core saturation or utilization;

N is the total number of cores 450 at time t;

F is the number of cores allocated to flushing 454 at time t;

BG1 is the number of cores allocated at time t to BG processing 456 when the system is at its maximum workload; and M is a mode-switching or gear shifting (GS) metric.

In EQUATION 4, the term $(N–F–BG1)^*M$ can be viewed as effective I/O core utilization denoting the I/O core utilization by I/O processing 452. The value of this term can be added to F and the sum divided by the number of cores used for real-time processing (as denoted by the denominator term "N–BG1"). The saturation or utilization metric calculated using EQUATION 4 scales linearly over a broad range of IOP values.

In at least one embodiment, a system can operate in a regular mode in which one or more operations such as data deduplication and/or compression, can be performed inline with each write operation storing new data. Such inline processing can generally use system resources which are then unavailable for other I/O processing of new reads and writes. Consistent with other discussion herein, at times when the system is in a heavy workload, the system can switch from the regular mode to a second higher I/O throughput mode (sometimes referred to herein as turbo mode) where performing such inline processing operations can be deferred and where such postponed or deferred inline processing contributes to deferred debt accumulation (which needs to be cleared, paid or completed within the current time period T). M can be periodically evaluated to determine when to switch between regular and higher I/O throughput modes. In at least one embodiment, M can be calculated as a linear combination of normalized read and write IOPS, and read and write BW per I/O core cycle (e.g., instruction processing cycle). When operating in regular mode and the value of M exceeds a high threshold HI, it indicates that the system has reached a saturation point (corresponding to a maximum possible IOPS) for the regular mode and the system can switch into the higher I/O throughput mode where deduplication and possibly other inline operations and/or BG processing operations can be deferred. When operating in the second higher I/O throughput mode and M falls below a low threshold LO, the system can switch to regular mode and resume inline deduplication and possibly other processing which had been deferred in the second higher throughput mode. In at least one embodiment, the inline processing of write I/Os, where such inline processing operations can include, for example, inline deduplication and/or compression, can be included in BG operations 456.

In one aspect, M can be viewed as a function that correlates utilization of I/O processing cores 452 (excluding cores used with BG 456 and flushing 454) with workload saturation. M can be more formally represented as in EQUATION 4A below:

$$M = c1^*IOPSW + c2^*IOPSR + c3^*BWW + c4^*BWR \qquad \text{EQUATION 4A}$$

where c1, c2, c3 and c4 are coefficients;

IOPSW denotes normalized write IOPS;

IOPSR denotes normalized read IOPS;

BWW denotes normalized write BW per I/O core cycle or instruction processing cycle; and BWR denotes normalized read BW per I/O core cycle or instruction processing cycle.

In at least one embodiment, the coefficients of EQUATION 4A can be, for example, decimal values between 0.0 and 1.0.

In at least one embodiment, EQUATION 4 for I/O core saturation can be used to calculate CLR metric values at different points in time t in a period T as discussed above and also expressed in EQUATION 5 below:

$$\text{CLR metric value}(t) = 100\% - \text{I/O core saturation}(t) \qquad \text{EQUATION 5}$$

where

"t" denotes a point in time in a period T; and

I/O core saturation(t) or saturation (t) denotes the I/O core saturation or utilization at the time t as calculated using EQUATION 4.

In at least one embodiment, EQUATION 4 for current I/O core saturation or utilization can be used to calculate PLR metric values at different points in time t in a period T as discussed above where, BG1 denoting a number of cores allocated for BG processing in EQUATION 4 is zero (0). More formally, the PLR metric value can be determined by first calculating PLR saturation or utilization for a point in time "t" as in EQUATION 6A below:

$$PLR \text{ saturation} = \frac{((N - F)^*M) + F}{N} \qquad \text{EQUATION 6A}$$

where N, F, M and N are values at a particular time "t" as described in connection with EQUATION 4;

and then calculating the PLR metric value for time "t" as in EQUATION 6B:

$$\text{PLR metric value}(t) = 100\% - \text{PLR saturation}(t) \qquad \text{EQUATION 6B}$$

where

PLR saturation(t) denotes the PLR saturation determined for time t using EQUATION 6A; and "t" denotes the point in time in the period T.

In at least one embodiment, the HLR metric for a respective HW resource at a point in time t can be calculated as in EQUATION 7 below:

$$\text{HLR metric value}(t) = 100\% - (\text{MAX HW UTIL}(t)) \qquad \text{EQUATION 7}$$

where

MAX HW UTIL denotes the maximum utilization of the respective HW resource at time t in the specified period T. Generally, the HLR metric values are typically proportional to the workload so that if the workload increases by a specified percentage, then the HLR metric values can be expected to increase by about the same specified percentage (e.g., within specified tolerances). In at least one embodiment using EQUATION 7 for the various types of HW components, the MAX HW UTIL can correspond to a percentage value proportional to the I/O bandwidth, for example, of NVRAM when determining NVRAM HLR; the I/O bandwidth, for example, of the BE PDs when determining SSD HLR (where the BE PDs are SSDs); and the I/O bandwidth of FE ports, for example, when determining FE HLR.

In connection with discussion below, EQUATIONS 8A, 9A, and 10A generally express current levels of utilization denoting a curve of utilization values over the period T with respect to the multiple points in time within T. EQUATIONS 8B, 9B and 10B each denote a single utilization value which can be used for modeling in connection with subsequently determining the minimum HW configuration for a revised target workload in at least one embodiment in accordance with the techniques of the present disclosure.

With reference back to FIG. 4, the FE HLR metric as described herein can be used to estimate or model the load reserve of unutilized resources of the FE components 254, where the current FE utilization denoting the current utilization or current level of saturation of the FE components over a period T can be defined as:

$$\text{FE utilization} = 100\% - \text{FE HLR} \qquad \text{EQUATION 8A}$$

wherein 100% can generally denote a maximum capability. Additionally for the period T over which the FE HLR curve is determined, the current FE utilization can be defined as the minimum FE HLR metric value expressed as:

$$\text{FE utilization} = 100\% - \text{MIN(FE HLR)} \qquad \text{EQUATION 8B}$$

where
"MIN (FE HLR)" denotes the single minimum FE HLR metric value at a single point in time, with respect to all FE HLR metric values in the FE HLR curve for the period T; and
100% can generally denote a maximum capability.

With reference back to FIG. 4, the SSD HLR metric as described herein can be used to estimate or model the load reserve of unutilized resources of the BE components 262, where the current BE or SSD utilization denoting the current utilization or current level of saturation of the BE SSD components over the period T can be defined as:

$$\text{SSD utilization} = 100\% - \text{SSD HLR} \qquad \text{EQUATION 9A}$$

wherein 100% can generally denote a maximum capability. Additionally, for a period T over which the SSD HLR curve is determined, the current SSD utilization can be defined as the minimum SSD HLR metric value expressed as:

$$\text{SSD utilization} = 100\% - \text{MIN(SSD HLR)} \qquad \text{EQUATION 9B}$$

where
"MIN(SSD HLR)" denotes the single minimum SSD HLR metric value at a single point in time, with respect to all SSD HLR metric values in the SSD HLR curve for the period T; and
100% can generally denote a maximum capability.

With reference back to FIG. 4, the NVRAM HLR metric, the LLR metric and the PLR metric as described herein can be used to estimate or model the load reserve of unutilized resources of the DP components 260. The current NVRAM utilization denoting the current utilization or current level of saturation of the NVRAM over the period T can be defined as:

$$\text{NVRAM utilization} = 100\% - \text{NVRAM HLR} \qquad \text{EQUATION 10A}$$

Additionally, for a period T over which the NVRAM HLR curve is determined, the current NVRAM utilization can be defined as the minimum NVRAM HLR metric value expressed as:

$$\text{NVRAM utilization} = 100\% - \text{MIN(NVRAM HLR)} \qquad \text{EQUATION 10B}$$

where
"MIN (NVRAM HLR)" denotes the single minimum NVRAM HLR metric value at a single point in time, with respect to all NVRAM HLR metric values in the NVRAM HLR curve for the period T; and
100% can generally denote a maximum capability.

The CPU load reserve denoting the unused CPU resources of the DP components 260 can be defined as:

$$\text{CPU load reserve} = \text{MIN(LLR, min PLR)} \qquad \text{EQUATION 11A}$$

where
min PLR denotes the single minimum PLR metric value in the PLR curve in the time period T; and
MIN(LLR, min PLR) denotes the single minimum of: the LLR metric, and the single minimum PLR value (e.g., indicated by "min PLR").

The effective CPU utilization denoting the current CPU utilization or current level of CPU saturation by the DP software of 260 can be defined as in EQUATION 11B and also, based on EQUATION 11A, equivalently as in EQUATION 11C:

$$\text{CPU utilization} = 100\% - \text{MIN(LLR, min PLR)} \qquad \text{EQUATION 11B}$$

$$\text{CPU utilization} = 100\% - \text{CPU load reserve} \qquad \text{EQUATION 11C}$$

wherein 100% can generally denote a maximum capability.

What will now be described is an example of estimating a minimum HW configuration in at least one embodiment in accordance with the techniques of the present disclosure.

Consistent with discussion herein, a data storage system can have a known HW configuration and is running a workload pattern F(t) with a workload pattern each time period or periodicity T. In at least one embodiment, F(t) can be an IOPS vs time curve such as discussed in connection with FIG. 5. Performance headroom and saturation or utilization of various components can be calculated for F(t) over T as described above and also below. Now, a user may want to scale up the current workload pattern F(t) by a multiplier also referred to herein as a target scale factor or TSF. The table 500 of FIG. 7 discussed below illustrates using the techniques of the present disclosure to determine a minimum HW configuration based on various inputs provided.

The table 500 of FIG. 7 includes the following columns of information: HW components 502a in column A; load reserve (LR) over T 502b in column B; LR % 502c in column C; current utilization or saturation as a percentage % 502d in column D; TSF for F(t) 502e in column E; % utilization or saturation for target workload 502f in column F; maximum (max) HW limit 502g in column G; HW scale factor 502h in column H; current configuration (config) 502i in column I; and new configuration (config) 502j in column J.

In at least one embodiment, inputs provided to processing in accordance with the techniques herein can include information denoted in columns B-E and I corresponding, respectively, to 502b-e and 502i of FIG. 7. Processing performed in accordance with the techniques of the present disclosure can use the foregoing inputs to determine the information denoted in columns F, H, I and J corresponding, respectively, to 502f, h, i and j of FIG. 7. Information of column G 502g can be determined based on the particular HW components as discussed in more detail below. FIG. 7 illustrates a particular example with illustrative input values denoted in column C 502c.

In the table 500 of FIG. 7, the row 504 denotes information about the CPU HW component; the row 506 denotes information about the NVRAM HW component; the row 508 denotes information about the SSD HW components; and the row 510 denotes information about the FE HW components. In particular, the HW components identified in 502a as CPU (row 504) and NVRAM (row 506) can be used to model the DP components 260 of FIG. 4; the HW components identified in 502a as SSD (row 508) can be used to model the BE components 262 of FIG. 4; and the HW components identified in 502a as FE can be used to model the FE components 254 of FIG. 4.

In the table 500 of FIG. 7, the information of row 504 for the CPU represents effective CPU utilization which accounts for CPU resource utilization and a coefficient that characterizes the ability of the current DP software 260 to utilize its CPU resources efficiently. Column B 502b generally represents how the LR for the different HW components (502a A) can be calculated. Column C 502c includes illustrative example values denoting percentages which can be calculated based on 502b B for the various HW components (502a A). Column D 502d can denote the current utilization or saturation as a percentage of the various HW components (502a A). Column E 502e denotes an example of a required target scale factor, which is the factor by which F(t) is required to be scaled up. Column F 502f denotes the target modeled or predicted utilization or saturation of the HW components when F(t) is incremented by the target scale factor (E 502e). In at least one embodiment, HW components having a predicted or modeled utilization or saturation (F 502f) which is generally less than 100 indicates that such HW components do not need further upgrading to handle the scaled up workload indicated by the TSF 502e and the predicted or modeled utilization or saturation (F 502f). Column G 502g denotes an assumed maximum HW limit for the HW components and is discussed in more detail below. Column H 502h indicates a HW scale factor denoting a factor by which the current configuration for the various HW components needs to be scaled up to meet the target utilization or saturation requirements (F 502f). In at least one embodiment, for a particular HW component (A 502a), if its associated HW scale factor (H 502H) is less than or equal to 1, no upgrade to the particular HW component is required to meet the scaled up target workload and associated target utilization or saturation (F 502F). Column I 502i denotes the current HW configuration for the various HW components of column A 502a. Column J 502j denotes the new proposed HW configuration for the various HW components of column A 502a based on the HW scale factors (H 502h). Thus, column J 502j denotes the minimum HW configuration determined in accordance with the techniques of the present disclosure in at least one embodiment. In at least one embodiment values of columns 502i-j can denote a number of HW component units which can vary with the type of HW component or resource. For example, for the SSD or NVRAM HW component type, values of 502i-j can denote a number of PDs or drives of a specified storage capacity, or can denote a number of storage units or storage capacity. For the FE HW component type, values of 502i-j can denote a number of FE ports having an associated maximum BW capability. For the CPU HW component type, values of 502i-j can denote CPU resource units such as processors, CPUs or processing cores.

For the CPU HW component of 502a, the row 504 indicates that:

the CPU LR (502b column B) can be calculated as the MIN(LLR, min PLR), where LLR can be calculated using EQUATION 1, and where "min PLR" denotes the minimum PLR metric value with respect to all PLR metric values calculated using EQUATION 6B for points in time during T;

the LR % (502c column C) indicates that in this example, the calculation of column B 502b for the CPU results in a value of 30%;

the current CPU utilization/saturation (502d D) as a percentage can be determined as 70% (e.g., 100% minus the LR % of 30 from column 502c C) and as expressed using EQUATIONS 11B and 11C; the TSF (502e E) is 3;

the % utilization or saturation (502f F) of 210 when the target workload is reached can be determined by multiplying values of column D 502d and column E 502e of the row 504 (e.g., from row 504, column D 502d=70 and column E 502e=3, where 70*3=210); the max HW limit (G 502g) of 75 can denote 75% representing a practical HW maximum limit or upper bound that can be achieved with respect to CPU resources;

the HW scale factor (502h H) can denote the HW scale factor by which the current HW configuration needs to be scaled up to meet the target workload and associated target utilization requirement (of 502f F) and can be calculated by dividing 210 (502f F of row 504) by 75 (502g G of row 504), where 210/75=2.8; and the new configuration (502j J) for the CPU HW component can be calculated as the mathematical product of the HW scale factor (502h H of 504) and the current configuration (502i I of 504), which in this example is 2.8*16=45 (J 502j of 504).

For the NVRAM component of 502a, the row 506 indicates that:

the NVRAM LR (502b column B) can be calculated as the MIN(NVRAM HLR), where "MIN(NVRAM HLR)" denotes the minimum NVRAM HLR metric value with respect to all NVRAM HLR metric values calculated for points in time during T;

the LR % (502c column C) indicates that in this example, the calculation of column B 502b for the NVRAM results in a value of 40%;

the current NVRAM utilization/saturation (502d D) as a percentage can be determined as 60% (e.g., 100% minus the LR % of 40 from column 502c C) and as expressed using EQUATION 10B;

the TSF (502e E) is 3;

the % utilization or saturation (502f F) of 180 when the target workload is reached can be determined by multiplying values of column D 502d and column E 502e of the row 506 (e.g., from row 506, column D 502d=60 and column E 502e=3, where 60*3=180);

the max HW limit (G 502g) of 90 can denote 90% representing a practical HW maximum limit or upper bound that can be achieved with respect to NVRAM resources;

the HW scale factor (502h H) can denote the HW scale factor by which the current HW configuration needs to be scaled up to meet the target workload and associated target utilization requirement (of 502f F) and can be calculated by dividing 180 (502f F of row 506) by 90 (502g G of row 506), where 180/90=2; and the new configuration (502j J) for the NVRAM HW component can be calculated as the mathematical product of the HW scale factor (502h H of 506) and the current configuration (502i I of 506), which in this example is 2*2=4 (J 502j of 506).

For the SSD component of 502a, the row 508 indicates that:

the SSD LR (502*b* column B) can be calculated as the MIN(SSD HLR), where "MIN(SSD HLR)" denotes the minimum SSD HLR metric value with respect to all SSD HLR metric values calculated for points in time during T;

the LR % (502*c* column C) indicates that in this example, the calculation of column B 502*b* for the SSD results in a value of 80%;

the current SSD utilization/saturation (502*d* D) as a percentage can be determined as 20% (e.g., 100% minus the LR % of 80 from column 502*c* C) and as expressed using EQUATION 9B;

the TSF (502*e* E) is 3;

the % utilization or saturation (502*f* F) of 60 when the target workload is reached can be determined by multiplying values of column D 502*d* and column E 502*e* of the row 508 (e.g., from row 508, column D 502*d*=20 and column E 502*e*=3, where 20*3=60);

the max HW limit (G 502*g*) of 90 can denote 90% representing a practical HW maximum limit or upper bound that can be achieved with respect to SSD resources;

the HW scale factor (502*h* H) can denote the HW scale factor by which the current HW configuration needs to be scaled up to meet the target workload and associated target utilization requirement (of 502*f* F) and can be calculated by dividing 60 (502*f* F of row 508) by 90 (502*g* G of row 508), where 60/90, which is less than 1 or 100% thereby indicating that the SSD HW in its current configuration can be expected to handle the scaled up target workload and does not need upgrading; and the new configuration (502*j* J) for the SSD HW component can be equal to that of the current configuration (502*i* I of 506), which in this example is 6, where 6 can denote a number of SSDs providing BE storage.

For the FE component of 502*a*, the row 510 indicates that:

the FE LR (502*b* column B) can be calculated as the MIN(FE HLR), where "MIN(FE HLR)" denotes the minimum FE HLR metric value with respect to all FE HLR metric values calculated for points in time during T;

the LR % (502*c* column C) indicates that in this example, the calculation of column B 502*b* for the FE results in a value of 70%;

the current FE utilization/saturation (502*d* D) as a percentage can be determined as 30% (e.g., 100% minus the LR % of 70 from column 502*c* C) and as expressed using EQUATION 8B;

the TSF (502*e* E) is 3;

the % utilization or saturation (502*f* F) of 90 when the target workload is reached can be determined by multiplying values of column D 502*d* and column E 502*e* of the row 510 (e.g., from row 508, column D 502*d*=30 and column E 502*e*=3, where 30*3=90);

the max HW limit (G 502*g*) of 90 can denote 90% representing a practical HW maximum limit or upper bound that can be achieved with respect to FE resources;

the HW scale factor (502*h* H) can denote the HW scale factor by which the current HW configuration needs to be scaled up to meet the target workload and associated target utilization requirement (of 502*f* F) and can be calculated by dividing 90 (502*f* F of row 510) by 90 (502*g* G of row 518), where 90/90, which is equal to 1 or 100% thereby indicating that the SSD HW in its current configuration can be expected to handle the scaled up target workload and does not need upgrading; and the new configuration (502*j* J) for the FE HW component can be equal to that of the current configuration (502*i* I of 506), which in this example is 4, where 6 can denote a number of NVRAM drives or units.

In at least one embodiment, the actual HW configuration required can be larger than as estimated for the minimum new configuration indicated by column J 502*j*. In at least one embodiment, the new configuration requirements requiring the addition of resources can be met, for example, by upgrading HW of a node to add HW resources, and/or adding a new appliance to meet or possibly exceed the new configuration requirements indicated by column J 502*j*.

In at least one embodiment, the values denoted by 502*c*, 502*d*, 502*f*, and 502*g* can be percentages. In at least one embodiment, the values denoted by 502*c*, 502*d*, and 502*g* can generally be percentages which are between 0% and 100%, inclusively (e.g., greater than or equal to 0% and also less than or equal to 100%).

Referring to FIGS. 8A and 8B, shown is a flowchart 600, 650 of processing steps that can be performed in at least one embodiment in accordance with the techniques of the present disclosure. The processing steps of FIGS. 8A and 8B summarize processing described above such as in connection with FIG. 7.

At the step 602, a TSF for a current workload F(t) can be received. In at least one embodiment, the TSF can be specified by, and received from, a user. For example, if the user wants to triple the current workload pattern, the user can specify a TSF=3 (e.g., column E 502*e* of FIG. 7). From the step 602, control proceeds to the step 604.

At the step 604, processing can be performed to calculate LR values over T for the types of HW components. The LR values can be percentages. For example, LR values can be calculated for the HW components of CPU, NVRAM, SSD and FE as denoted in column B 502*b* of FIG. 7. Column C 502*c* of FIG. 7 illustrates example LR values for the HW components calculated in accordance with equations indicated by the column B 502*b* of FIG. 7. From the step 604, control proceeds to the step 606.

At the step 606, processing can be performed to calculate current utilization or saturation percentages for the types of HW components based on the LR % values of column C 502*c* of FIG. 7. Consistent with discussion herein, current utilization or saturation of a HW component can be determined by subtracting its current % utilization or saturation (column C 502*c*) from 100%. Column D 502*d* of FIG. 7 illustrates example current utilization or saturation percentages calculated for the HW components in accordance with values of column C 502*c* of FIG. 7. From the step 606, control proceeds to the step 608.

At the step 608, new target utilization or saturation percentages (column F 502*f* of FIG. 7) can be determined for the types of HW components. When F(t) is scaled up by the TSF=3 in this example, new target utilization or saturation percentages (column F 502*f* of FIG. 7) for the types of HW components can be estimated based on the TSF and corresponding current utilization or saturation % values (column D 502*d*). Column F 502*f* of FIG. 7 illustrates example new target utilization or saturation percentages calculated for the HW components by multiplying the TSF by corresponding current utilization or saturation % values (column D 502*d*). In at least one embodiment, any type of HW component having a corresponding target utilization or saturation (column F 502*f*) at the target workload which is equal to or less than 1 or 100% may not require any upgrade in connection with a modeled minimum HW configuration. From the step 608, control proceeds to the step 610.

At the step 610, HW scale factors (column H 502*h*) can be determined for each of the types of HW components by dividing utilization or saturation at target workload (column F 502*f*) by a corresponding maximum allowed utilization or saturation of the corresponding HW component type (column G 502*g*). Ideally, the allowed maximum utilization or saturation for any type of HW component can be 100%. However, such a 100% limit is not typically and practically reached. As a result, an embodiment can select a suitable lower percentage which is less than 100% and represented as "max HW limit" (column G 502*g*). The max HW limit for a HW component type column A 502*a*) can vary with the HW component type. For example, for FE, NVRAM and SSD HW component types, a max HW limit of 90% of a theoretical maximum BW can be used. As another example, the CPU HW component type in column A 502*a* of row 504 is used in modeling the CPU resource utilization with respect to DP software of the DP components 260. In at least one embodiment, effective CPU utilization over 75% can typically trigger transition from regular mode to turbo mode where various operations and processing, such as inline deduplication, BG processing, and the like, can be disabled and postponed. In such an embodiment, the max HW limit for the DP components 260 and thus the CPU component type associated with row 504 of FIG. 7 can be 75%. From the step 610, control proceeds to the step 612.

At the step 612, processing can be performed to determine the new minimum HW configuration for the revised target utilization or saturation percentages (column F 502F) of the HW components when reaching or handling the modeled scaled up target workload. The minimum HW configuration can be determined by multiplying a number of HW components in the current configuration (column I 502*i*) for each type of HW component by a corresponding HW scale factor (column H 502*h*) for the type of HW component. From the step 612, control proceeds to the step 614.

At the step 614, processing can be performed to upgrade the data storage system based on the new minimum HW configuration from the step 612. For example, with reference to FIG. 7, the new HW configuration denoted by column J 502*j* indicates that the CPU and NVRAM resources require upgrading and need to be increased to handle the scaled up target workload based on the TSF=3 (502*e*). However, the SSD and FE HW components do not require upgrading or additional resources to handle the scaled up target workload. The particular manner in which the HW resources or components are upgraded or increased can vary with the system and particular type of HW component or resources. For example, if the FE components need to be upgraded, the step 614 can include increasing the number of FE ports and/or increasing the link speed of FE ports. To upgrade SSDs which are used as BE PDs for BE components, the step 614 can generally include increasing the BE storage capacity such as by adding additional SSDs to the BE PDs and/or increasing the storage capacity of individual BE PDs. To upgrade the CPU HW component, additional CPUs and/or processing cores can be added. In at least one embodiment, it may not be possible to expand the number of CPUs in an existing node or appliance. As a result, increasing the CPU HW component can include, for example, adding a new appliance rather than upgrading HW of existing appliances or nodes.

In at least one embodiment, the processing of FIGS. 8A and 8B can be performed responsive to receiving a request from a user of the data storage system where the user may want to know the projected, modeled HW configuration needed for handling a target workload which can be represented by a scaling factor applied to the current workload. The target workload can be expressed as a linear scaling of the current workload, for example, by multiplying the current workload by the scaling factor. The scaling factor can be expressed as an integer value, a decimal value or a percentage which is a multiplier applied to the current workload.

The workload pattern F(t) can be determined in any suitable manner. In at least one embodiment, F(t) can be determined based on observed behavior for a particular workload. The workload can be an I/O workload characterized by, for example, a total number of IOPS, a mixture of ratio of read I/O with respect to write I/Os, read I/O size, write I/O size, whether the workload is random or sequential, and the like.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:

receiving a request for a new hardware configuration of a data storage system, wherein the data storage system has a current configuration and is currently running a first workload W1 with a workload pattern P1 having an associated workload periodicity interval, wherein the first workload W1 corresponds to a first input/output (I/O) workload of the data storage system, wherein the new hardware configuration is modeled as running an associated second workload W2 with the workload pattern P1 and the associated workload periodicity interval, wherein the associated second workload W2 corresponds to an associated second I/O workload of the data storage system; and wherein the associated second I/O workload is equal to the first I/O workload multiplied by a target scale factor (TSF);

in response to the request, determining the new hardware configuration in accordance with the TSF and a plurality of hardware utilizations of a plurality of hardware components in the current configuration while running the first I/O workload with the workload pattern P1 having the associated workload periodicity interval; and upgrading the current configuration of the data storage system based on the new hardware configuration.

2. The computer-implemented method of claim 1, wherein the plurality of hardware components includes a plurality of hardware component types, and wherein each of the plurality of hardware utilizations is determined for a corresponding one of the plurality of hardware component types.

3. The computer-implemented method of claim 2, further comprising:

modeling front-end components of an I/O path using at least a first of the plurality of hardware component types, wherein the first hardware component type has a corresponding hardware utilization of the plurality of hardware utilizations, and wherein said determining the new hardware configuration includes:

determining a minimum front-end load reserve metric value of a plurality of front-end load reserve metric values for the specified periodicity interval; and calculating said corresponding hardware utilization as a result of subtracting the minimum front-end load reserve metric value from 100%.

4. The computer-implemented method of claim 3, wherein the first hardware component type includes front-end ports of the data storage system which receive I/O requests from external storage system clients.

5. The computer-implemented method of claim 4, wherein said determining the new hardware configuration includes:

multiplying the corresponding hardware utilization by the TSF to obtain a second hardware utilization modeling utilization of the first hardware component type when running the second workload W2;

dividing the second hardware utilization by a maximum utilization to obtain a hardware scale factor; and multiplying the hardware scale factor by a current number of resources of the first hardware component type to obtain a revised number of resources of the first hardware component type, wherein the revised number indicates an amount of resource of the first hardware component type included in the new hardware configuration.

6. The computer-implemented method of claim 5, wherein if the hardware scale factor is not greater than 1 or 100%, the current number of resources of the first hardware component type is capable of running the second workload W2 with the workload pattern P1 and the associated workload periodicity interval.

7. The computer-implemented method of claim 2, further comprising:

modeling back-end components of an I/O path using at least a first of the plurality of hardware component types, wherein the first hardware component type has a corresponding hardware utilization of the plurality of hardware utilizations, and wherein said determining the new hardware configuration includes:

determining a minimum back-end load reserve metric value of a plurality of back-end load reserve metric values for the specified periodicity interval; and calculating said corresponding hardware utilization as a result of subtracting the minimum back-end load reserve metric value from 100%.

8. The computer-implemented method of claim 7, wherein said determining the new hardware configuration includes:

multiplying the corresponding hardware utilization by the TSF to obtain a second hardware utilization modeling utilization of the first hardware component type when running the second workload W2;

dividing the second hardware utilization by a maximum utilization to obtain a hardware scale factor; and multiplying the hardware scale factor by a current number of resources of the first hardware component type to obtain a revised number of resources of the first hardware component type, wherein the revised number indicates an amount of resource of the first hardware component type included in the new hardware configuration.

9. The computer-implemented method of claim 8, wherein if the hardware scale factor is not greater than 1 or 100%, the current number of resources of the first hardware component type is capable of running the second workload W2 with the workload pattern P1 and the associated workload periodicity interval.

10. The computer-implemented method of claim 7, wherein the first hardware component type includes non-volatile storage devices providing back-end storage of storage client data in the data storage system.

11. The computer-implemented method of claim 2, further comprising:

modeling data path components of an I/O path using at least a first of the plurality of hardware component types, wherein the first hardware component type has a first corresponding hardware utilization of the plurality of hardware utilizations, wherein the first hardware component type includes processor resources executing first software included in the data path components, and wherein said determining the new hardware configuration includes:

determining a long term load reserve (LLR) metric value;

determining a minimum peak load reserve (PLR) metric value of a plurality of PLR metric values for the specified periodicity interval;

determining a first minimum of the LLR metric value and the minimum PLR;

and calculating said corresponding first hardware utilization as a result of subtracting the first minimum from 100%.

12. The computer-implemented method of claim 11, wherein said determining the new hardware configuration includes:

multiplying the corresponding first hardware utilization by the TSF to obtain a second hardware utilization modeling utilization of the first hardware component type when running the second workload W2;

dividing the second hardware utilization by a maximum utilization to obtain a hardware scale factor; and multiplying the hardware scale factor by a current number of resources of the first hardware component type to obtain a revised number of resources of the first hardware component type, wherein the revised number indicates an amount of resource of the first hardware component type included in the new hardware configuration.

13. The computer-implemented method of claim 12, wherein if the hardware scale factor is not greater than 1 or 100%, the current number of resources of the first hardware component type is capable of running the second workload W2 with the workload pattern P1 and the associated workload periodicity interval.

14. The computer-implemented method of claim 11, wherein said modeling the data path components of the I/O path uses the first hardware type and additionally uses a second of the plurality of hardware types, wherein the second hardware component type has a second corresponding hardware utilization of the plurality of hardware utilizations, wherein the second hardware component type includes first non-volatile storage used to log or cache write operations and associated write data for the write operations received at the data storage system.

15. The computer-implemented method of claim 14, wherein the first non-volatile storage includes non-volatile random access memory.

16. The computer-implemented method of claim 14, wherein the first software includes software that performs I/O processing, flushing of recorded write data and write operations from the first non-volatile storage, and background operations.

17. The computer-implemented method of claim 16, wherein the background operations include at least one of: garbage collection, data deduplication, and compression.

18. The computer-implemented method of claim 14, wherein said determining the new hardware configuration includes:

determining, for the first non-volatile storage, a minimum load reserve metric value of a plurality of load reserve metric values for the first non-volatile storage for the specified periodicity interval;

calculating said second corresponding hardware utilization as a result of subtracting the minimum load reserve metric value for the first non-volatile storage from 100%;

multiplying the second corresponding hardware utilization by the TSF to obtain a third hardware utilization modeling utilization of the second hardware component type when running the second workload W2;

dividing the third hardware utilization by a maximum utilization to obtain a hardware scale factor;

multiplying the hardware scale factor by a current number of resources of the second hardware component type to obtain a revised number of resources of the second hardware component type, wherein the revised number indicates an amount of resource of the second hardware component type included in the new hardware configuration, and wherein if the hardware scale factor is not greater than 1 or 100%, the current number of resources of the second hardware component type is capable of running the second workload W2 with the workload pattern P1 and the associated workload periodicity interval.

19. A system comprising:

one or more processors; and a memory comprising code stored thereon that, when executed, performs a method comprising:

receiving a request for a new hardware configuration of a data storage system, wherein the data storage system has a current configuration and is currently running a first workload W1 with a workload pattern P1 having an associated workload periodicity interval, wherein the first workload W1 corresponds to a first input/output (I/O) workload of the data storage system, wherein the new hardware configuration is modeled as running an associated second workload W2 with the workload pattern P1 and the associated workload periodicity interval, wherein the associated second workload W2 corresponds to an associated second I/O workload of the data storage system; and wherein the associated second I/O workload is equal to the first I/O workload multiplied by a target scale factor (TSF);

in response to the request, determining the new hardware configuration in accordance with the TSF and a plurality of hardware utilizations of a plurality of hardware components in the current configuration while running the first I/O workload with the workload pattern P1 having the associated workload periodicity interval; and upgrading the current configuration of the data storage system based on the new hardware configuration.

20. A non-transitory computer readable medium comprising code stored thereon that, when executed, performs a method comprising:

receiving a request for a new hardware configuration of a data storage system, wherein the data storage system has a current configuration and is currently running a first workload W1 with a workload pattern P1 having an associated workload periodicity interval, wherein the first workload W1 corresponds to a first input/output (I/O) workload of the data storage system, wherein the new hardware configuration is modeled as running an associated second workload W2 with the workload pattern P1 and the associated workload periodicity interval, wherein the associated second workload W2 corresponds to an associated second I/O workload of the data storage system; and wherein the associated second I/O workload is equal to the first I/O workload multiplied by a target scale factor (TSF);

in response to the request, determining the new hardware configuration in accordance with the TSF and a plurality of hardware utilizations of a plurality of hardware components in the current configuration while running the first I/O workload with the workload pattern P1 having the associated workload periodicity interval; and upgrading the current configuration of the data storage system based on the new hardware configuration.

\* \* \* \* \*